United States Patent
Buchenau

(10) Patent No.: US 11,402,237 B2
(45) Date of Patent: Aug. 2, 2022

(54) DEVICE, ARRANGEMENT AND METHOD FOR CHARACTERIZING THE TORSION, ROTATION AND/OR POSITIONING OF A SHAFT

(71) Applicant: HELMHOLTZ-ZENTRUM DRESDEN—ROSSENDORF E.V., Dresden (DE)

(72) Inventor: Dominique Buchenau, Dresden (DE)

(73) Assignee: Helmholtz-Zentrum Dresden-Rossendorf e.V., Dresden (DE)

(*) Notice: Subject to any disclaimer, the term of this patent is extended or adjusted under 35 U.S.C. 154(b) by 321 days.

(21) Appl. No.: 16/616,154

(22) PCT Filed: Apr. 27, 2018

(86) PCT No.: PCT/EP2018/060858
§ 371 (c)(1),
(2) Date: Nov. 22, 2019

(87) PCT Pub. No.: WO2018/215167
PCT Pub. Date: Nov. 29, 2018

(65) Prior Publication Data
US 2020/0158538 A1    May 21, 2020

(30) Foreign Application Priority Data
May 22, 2017 (DE) ..................... 10 2017 111 055.0

(51) Int. Cl.
G01D 5/22 (2006.01)
G01D 5/14 (2006.01)
G01L 3/10 (2006.01)

(52) U.S. Cl.
CPC ............... G01D 5/22 (2013.01); G01D 5/145 (2013.01); G01L 3/109 (2013.01)

(58) Field of Classification Search
CPC .......... G01D 5/22; G01D 5/145; G01L 3/109
See application file for complete search history.

(56) References Cited

U.S. PATENT DOCUMENTS

| 4,840,073 A | 6/1989 | Aoki et al. |
| 6,422,095 B1 | 7/2002 | Shimizu et al. |
| (Continued) | | |

FOREIGN PATENT DOCUMENTS

| CN | 101303260 A | 11/2008 |
| CN | 101871827 A | 10/2010 |
| (Continued) | | |

*Primary Examiner* — Clayton E. LaBalle
*Assistant Examiner* — Michael A Harrison
(74) *Attorney, Agent, or Firm* — Laurence A. Greenberg; Werner H. Sterner; Ralph E. Locher

(57) ABSTRACT

The invention relates to a device, an arrangement and a method for characterizing the torsion, rotation, and/or positioning of a shaft by generating a periodic magnetic field of a magnetic field generator disposed between at least two magnetic field detectors by applying a periodic exciter signal. The field is modified by the shaft and induces an output signal at each of the magnetic field detectors. The difference with respect to amplitude or phase between the exciter signal and the first output signal is detected as a first measured variable and between the exciter signal and the second output signal is detected as a second measured variable. The total of and/or the difference between the first and the second measured variables is calculated, and the torsion, rotation, and/or positioning of the shaft is characterized based thereon.

15 Claims, 5 Drawing Sheets

(56) References Cited

U.S. PATENT DOCUMENTS

| | | | |
|---|---|---|---|
| 9,234,811 B2 | 1/2016 | Brummel et al. | |
| 9,645,022 B2 | 5/2017 | Brummel et al. | |
| 2018/0058958 A1* | 3/2018 | Lu | G01L 3/102 |
| 2018/0306654 A1 | 10/2018 | Stephan et al. | |

FOREIGN PATENT DOCUMENTS

| | | |
|---|---|---|
| CN | 103649705 A | 3/2014 |
| DE | 102006017727 A1 | 10/2007 |
| EP | 2549255 B1 | 1/2013 |
| EP | 2615439 A1 | 7/2013 |
| JP | 2001133337 A | 5/2001 |
| WO | 2017076876 A1 | 5/2017 |

* cited by examiner

DEVICE, ARRANGEMENT AND METHOD FOR CHARACTERIZING THE TORSION, ROTATION AND/OR POSITIONING OF A SHAFT

BACKGROUND OF THE INVENTION

Field of the Invention

The invention relates to a device, an arrangement, and a method for characterizing the torsion state and/or the rotation state and/or the positioning of a shaft.

In many fields, knowing the torsion, rotation, and location parameters of rotating shafts is relevant, for example knowing the rotational velocity, the applied torque, or the location and/or alignment of the shaft. In many fields, for example in heavy machinery construction, in conveyance and transportation industries, but also for vacuum systems, centrifugal technologies, and in the automotive sector, a contactless determination of these parameters is advantageous. A variety of different principles are known for the contactless inductive location, speed, or torque determination. As an example, a sensor arrangement for the contactless determination of the effective torque in a shaft is described in EP 2 549 255 B1; moreover, further contactless measurement principles are known from the prior art cited in EP 2 549 255 B1. Conventional principles for contactless shaft characterization, however, often require a complicated structure, are only suitable for a small application spectrum (for example, because of constructive requirements or because of the restriction to only one single detectable operation parameter), and/or supply measurement results subject to high levels of inaccuracy.

SUMMARY OF THE INVENTION

An uncomplicated, versatile device for the contactless characterization of the torsion state, the rotation state, and/or the positioning of a shaft is to be provided by the invention, by means of which a detection of the operation parameters of the shaft with high accuracy is enabled.

According to a first aspect of the invention, a device is provided for characterizing (for example, detecting or measuring) the torsion and/or the rotation and/or the positioning of a (for example, rotatable) shaft, wherein the device is also referred to hereafter as a measuring device.

The shaft can be a hollow shaft or a solid shaft. The shaft comprises ferromagnetic material, i.e., the shaft consists at least partially (i.e., partially or completely) of ferromagnetic material. It can be provided, for example, that the shaft comprises a coating having ferromagnetic material on its outer circumference (i.e., the coating consists partially or completely of ferromagnetic material), wherein the remainder of the shaft can consist of nonferromagnetic material. The ferromagnetic material is moreover preferably electrically conductive.

The measuring device comprises a magnetic field generator for generating a magnetic field. The magnetic field generator is a device by which a magnetic field is generated upon application of an electric signal, i.e., upon application of an electric current or an electric voltage, in dependence on the signal (the signal is also referred to hereafter as an exciter signal or input signal). It can be provided that the measuring device comprises precisely one single magnetic field generator. The magnetic field generator can be, for example, a coil (also referred to hereafter as an exciter coil or magnetic field generator coil). If the magnetic field generator of the measuring device is formed as an exciter coil, the exciter coil is formed in such a way that it comprises a linear coil axis (also referred to as an exciter coil axis).

The measuring device moreover comprises at least a first and a second magnetic field detector for detecting a magnetic field. The first magnetic field detector is preferably formed identically to the second magnetic field detector. It can also be provided that the measuring device comprises a third and a fourth magnetic field detector in addition to the first and the second magnetic field detector. The third magnetic field detector is preferably formed identically to the fourth magnetic field detector. The measuring device preferably comprises an even number of magnetic field detectors. All magnetic field detectors of the measuring device are preferably formed identically. The magnetic field detectors are devices by which an electric signal, i.e., an electric current or an electric voltage, is generated upon application of an external magnetic field in dependence on the external magnetic field (these signals are also referred to hereafter as output signals or receiver signals). The magnetic field detectors of the measuring device can be designed, for example, as Hall detectors.

As another example, each of the magnetic field detectors of the measuring device can be, for example, a coil (also referred to as a receiver coil or magnetic field detector coil hereafter). Accordingly, the first magnetic field detector can be a first receiver coil and/or the second magnetic field detector can be a second receiver coil. If the measuring device is formed having a third and a fourth magnetic field detector, the third magnetic field detector can be a third receiver coil and/or the fourth magnetic field detector can be a fourth receiver coil. If the magnetic field detectors of the measuring device are formed as receiver coils, the receiver coils are formed and arranged in such a way that each of the receiver coils comprises a linear coil axis (also referred to as a receiver coil axis), wherein all receiver coil axes extend in parallel to one another at a distance from one another.

If the magnetic field generator is formed as an exciter coil and the magnetic field detectors are formed as receiver coils, the coils are arranged in such a way that the coil axes thereof each extend in parallel to one another at a distance from one another, so that the receiver coil axes extend in parallel to the exciter coil axis. The exciter coil and/or the receiver coils can each be formed, for example, rotationally symmetrical with respect to the coil axis thereof. However, it can also be provided that the exciter coil and/or the receiver coils are not rotationally symmetrical with respect to the coil axis thereof (but rather are formed having a rectangular cross section, for example). Moreover, it can be provided that the exciter coil and the receiver coils are formed identically to one another, so that in particular the exciter coil is formed identically to the receiver coils. An improvement of the measurement accuracy of the measuring device is thus enabled.

It can be provided that the magnetic field generator and the magnetic field detectors of the measuring device are combined to form a common sensor element of the measuring device. It can accordingly be provided that the measuring device comprises a sensor element, wherein the sensor element comprises the magnetic field generator and the magnetic field detectors of the measuring device. The sensor element functions as a measurement head of the measuring device and is arranged laterally adjacent to the shaft to be characterized during operation of the measuring device.

The magnetic field generator is arranged between the first and the second magnetic field detector. The magnetic field generator is thus arranged on a connecting line extending between the first and the second magnetic field detector, wherein this connecting line is also referred to as the main axis or sensor main axis. The first and the second magnetic field detector and also the magnetic field generator are thus arranged at positions on and/or along the sensor main axis. The magnetic field generator is preferably arranged in the middle between the first and the second magnetic field detector, so that the first and the second magnetic field detector are arranged equidistantly and symmetrically on both sides of the magnetic field generator. If the magnetic field generator and the first and the second magnetic field detector are formed as coils, the coils are preferably arranged in such a way that the coil axes thereof extend in parallel to one another in a common plane, wherein this plane extends through the sensor main axis. The magnetic field generator can in particular be designed and arranged in such a way that the magnetic field generated thereby comprises at least one fraction which is perpendicular to the sensor main axis, so that the magnetic field generated by the magnetic field generator comprises a component extending perpendicularly to the sensor main axis or is completely perpendicular to the sensor main axis.

If the magnetic field generator is formed as an exciter coil, the exciter coil is preferably arranged in such a way that the exciter coil axis is perpendicular to the sensor main axis. If the magnetic field detectors are formed as receiver coils, the receiver coils are preferably arranged in such a way that the receiver coil axes are perpendicular to the sensor main axis.

If the measuring device is formed having a third and a fourth magnetic field detector, the magnetic field generator is moreover arranged between the third and the fourth magnetic field detector. In this case, the magnetic field generator is thus arranged on a connecting line extending between the third and the fourth magnetic field detector, wherein this connecting line is also referred to as a secondary axis or sensor secondary axis. The third and the fourth magnetic field detector and also the magnetic field generator are thus arranged at positions on and/or along the sensor secondary axis. The magnetic field generator is preferably arranged in the middle between the third and the fourth magnetic field detector, so that the third and the fourth magnetic field detector are arranged equidistantly and symmetrically on both sides of the magnetic field generator. If the magnetic field generator and the third and the fourth magnetic field detector are formed as coils, the coils are preferably arranged in such a way that the coil axes thereof extend in parallel to one another in a common plane, wherein this plane extends through the sensor secondary axis. The sensor secondary axis preferably extends perpendicularly to the sensor main axis, so that the sensor secondary axis and the sensor main axis form a right-angled cross. The first, second, third, and fourth magnetic field detector are preferably arranged equidistantly to the magnetic field generator, i.e., they all have the same distance to the magnetic field generator. The magnetic field generator can in particular be formed and arranged in such a way that the magnetic field generated thereby has at least one fraction which is perpendicular to the sensor secondary axis, so that the magnetic field generated by the magnetic field generator comprises a component extending perpendicularly to the sensor secondary axis or is completely perpendicular to the sensor secondary axis. The magnetic field generator is preferably designed and arranged in such a way that the magnetic field generated thereby comprises at least one fraction which is perpendicular to the plane spanned by the sensor main axis and the sensor secondary axis (also referred to as a sensor plane), so that the magnetic field generated by the magnetic field generator comprises a component extending perpendicularly to this plane or is completely perpendicular to this plane.

The magnetic field generator can be formed and arranged, for example, in such a way that the magnetic field generated thereby is symmetrical with respect to a plane which is perpendicular to the sensor main axis or forms an angle of 45° with the sensor main axis and/or the sensor secondary axis. The magnetic field generator can be formed, for example, in such a way that the magnetic field generated thereby is rotationally symmetrical, in particular rotationally symmetrical with respect to a direction extending perpendicularly to the sensor main axis and/or the sensor secondary axis, for example rotationally symmetrical with respect to the normal of the sensor plane.

If the magnetic field generator is formed as an exciter coil, the exciter coil is preferably arranged in such a way that the exciter coil axis is perpendicular to the sensor secondary axis. If the magnetic field detectors are formed as receiver coils, the receiver coils are preferably arranged in such a way that the receiver coil axes are perpendicular to the sensor secondary axis. Accordingly, the exciter coil and the receiver coils can be arranged in such a way that the coil axes thereof are perpendicular to the sensor plane.

The measuring device is designed (for example, by means of an electric power source designed for this purpose) to apply a chronologically periodically varying electrical exciter signal to the magnetic field generator, i.e., to apply a periodically varying electric current or a periodically varying electric voltage to the magnetic field generator. The measuring device is thus designed to apply a periodic exciter signal having a predetermined frequency to the magnetic field generator. The measuring device can be designed, for example, to apply a harmonic exciter signal to the magnetic field generator, i.e., a current or a voltage having a sinusoidal time curve. The exciter signal can be in particular an alternating current or an AC voltage, in particular a harmonic alternating current or a harmonic AC voltage having a predetermined frequency.

During the operation of the measuring device, the periodic exciter signal is applied to the magnetic field generator (for example, formed as an exciter coil) by the measuring device, whereby a chronologically periodic magnetic field having a chronologically periodically varying field strength is generated by the magnetic field generator. The magnetic field generated by the magnetic field generator as a result of the exciter signal is also referred to as a primary magnetic field or exciter field. If the exciter signal is formed as an alternating current or AC voltage, the exciter field is a magnetic alternating field.

The exciter field generated by the magnetic field generator interacts with the ferromagnetic material of the shaft to be characterized, whereby a further magnetic field is generated (also referred to as an induced magnetic field or secondary magnetic field). The interaction and thus also the secondary magnetic field are dependent on the torsion state and the rotation state of the shaft and also on the positioning of the shaft in relation to the measuring device, wherein the overall magnetic field resulting due to the superposition of the primary magnetic field and the secondary magnetic field differs in phase and/or amplitude from the primary magnetic field. The secondary magnetic field is thus, for example, dependent on the rotational velocity (expressed by the tangential velocity or angular velocity) of the shaft, on the torque applied to the shaft and the torsion (for example, accompanying this torque) of the shaft, and on the distance between the measuring device and the shaft.

A rotation of the shaft is accompanied, for example, by a movement of the ferromagnetic and electrically conductive material of the shaft in the exciter field, which results in an induction of electric currents in the material. An induced magnetic field, which is overlaid on the exciter field and changes it in amplitude and/or phase, is generated by the induced electric currents, wherein the change in amplitude and/or phase is proportional to the peripheral velocity of the shaft in the exciter field.

Furthermore, a transmission of a torque can be accompanied, for example, by a torsion of the shaft. The elastic and thus reversible deformation of a solid body is described by Hooke's law, according to which a force acting on an elastically deformable body is expressed in a change of the geometry of the loaded body. A (cylinder-symmetrical) shaft loaded by torsion accordingly experiences an opposing deformation state, which can be characterized by tension lines and compression stress lines. The material is elongated along the tension lines, while in contrast it is compressed along the compression lines. The compression and stretching of the ferromagnetic material of the shaft causes a change of the tension state, which is in turn accompanied by a change of the magnetic properties of the ferromagnetic shaft material. Thus, for example, a different variation of the magnetic properties of the ferromagnetic shaft material takes place in the tension direction and in the compression direction if a preferred direction is predetermined. As an example, in the case of a ferromagnetic coating of a shaft (and/or in the case of a rotationally-symmetrical hollow cylinder made of a ferromagnetic material), an increase of the magnetic susceptibility occurs in the tension direction and a reduction of the magnetic susceptibility occurs in the compression direction. For magnetic materials without preferred direction, the torsion load solely causes worsening of the magnetizability. Thus, for example, in the case of a solid shaft made of a ferromagnetic material, a torsion substantially causes worsening of the magnetizability. Measurement and/or action principles of this type are referred to as mechanical-magnetic transformation principles. In general, the exciter field applied to the ferromagnetic shaft material will be distributed differently in amplitude and phase for the mechanically unloaded and the mechanically loaded tension state of the shaft. In general, the secondary magnetic field is thus also dependent on the torsion or the torque of the shaft, wherein the secondary magnetic field is superimposed on the exciter field and thus changes it in amplitude and/or phase in dependence on the torsion and/or the torque.

Furthermore, the magnetic interaction between the exciter field and the ferromagnetic material changes, for example, with the positioning of the measuring device in relation to the shaft, for example with the distance between the measuring device and the shaft.

An overall magnetic field, which can be detected by means of the magnetic field detectors of the measuring device, results from the superposition of the primary field with the secondary field. The overall magnetic field differs in amplitude and/or phase from the primary magnetic field as a result of the interaction with the ferromagnetic shaft material. By means of a comparison of the primary magnetic field to the overall magnetic field, inferences can thus be drawn about the torsion state, the rotation state, and the positioning of the shaft, in particular inferences about the rotational velocity and the torsion of the shaft, the torque applied to the shaft, and the distance between the shaft and the measuring device. The effects or actions to be measured effectively originate from a coefficient of the system, which is composed as a product of the contributions such as magnetic permeability, electrical conductivity, and velocity of the measurement object. The coefficient is referred to in magneto-dynamics as the "magnetic Reynolds number".

The exciter field is thus modified by the shaft to be characterized, wherein an electrical output signal is induced by the modified magnetic field (i.e., the resulting overall magnetic field) at each of the magnetic field detectors, in particular a first electric output signal at the first magnetic field detector and a second electric output signal at the second magnetic field detector. If the measuring device is embodied having four magnetic field detectors, moreover a third output signal is induced at the third magnetic field detector and a fourth output signal is induced at the fourth magnetic field detector.

The measuring device is designed (for example, by means of an analysis device designed for this purpose) to detect the difference with respect to amplitude and/or phase between the exciter signal and the first output signal as a first measured variable and between the exciter signal and the second output signal as a second measured variable. It can be provided, for example, that the measuring device is designed to detect the exciter signal, the first output signal, and the second output signal and also to ascertain the first and the second measured variable based on the detected signals.

The measuring device can thus be designed to detect the difference between the amplitude of the exciter signal and the amplitude of the first output signal as the first measured variable and to detect the difference between the amplitude of the exciter signal and the amplitude of the second output signal as the second measured variable, wherein the first and the second measured variable are provided by an amplitude difference. Alternatively or additionally thereto, the measuring device can be designed to detect the difference between the phase of the exciter signal and the phase of the first output signal as the first measured variable and to detect the difference between the phase of the exciter signal and the phase of the second output signal as the second measured variable, wherein the first and the second measured variable are provided by a phase difference.

If a current signal functions as the exciter signal, the first and the second output signal are preferably also current signals. If a voltage signal functions as the exciter signal, the first and the second output signal are preferably also voltage signals. However, it can also be provided—in particular for the case that phase differences are detected as the first and second measured variable—that the exciter signal is a current signal and the output signals are voltage signals, or that the exciter signal is a voltage signal and the output signals are current signals.

By means of the measuring device, the difference with respect to amplitude or phase between the exciter signal and the first output signal is thus detected as a first channel and the difference with respect to amplitude or phase between the exciter signal and the second output signal is detected as a second channel. The measuring device can thus be designed, for example, to carry out a two-channel measurement, wherein the two signal channels supply the first and the second measured variable.

The measuring device is moreover designed to ascertain the total of the first and the second measured variable and/or to ascertain the difference between the first and the second measured variable. By means of the total and the difference of the first and the second measured variable, as a result of the above-explained interactions of the exciter field with the shaft, inferences can be drawn about the torsion state, the rotation state, and the positioning of the shaft to be characterized, for example the torque applied to the shaft, the rotational velocity of the shaft, and the distance between the measuring device and the shaft can be ascertained.

In that the measuring device only requires one magnetic field generator arranged between magnetic field detectors for the magnetic field generation and magnetic field detection, wherein, for example, all elements used for the magnetic field generation and detection can be combined into a common sensor element or measurement head, an uncomplicated and compact structure of the measuring device is enabled. As a result of the arrangement geometry of the magnetic field generator and the magnetic field detectors, all of these elements can be arranged on the same side of the shaft to be characterized (for example, by the sensor element being arranged on one side of the shaft), whereby the measuring device is versatile and can be retrofitted with a small space requirement without problems even on existing facilities and/or shafts. A versatile usability is additionally assisted by the measuring device being suitable for characterizing solid shafts, hollow shafts, and ferromagnetically coated shafts. Simultaneous detection of a plurality of the cited parameters in real time is enabled by different rotation and location parameters being able to be ascertained by means of the measuring device by means of calculation of the total and the difference of the detected measured variables. Moreover, overcoming the previously unsolved problems of material-specific hysteresis effects, and also the limiting of drift and interfering influences in static and dynamic operation is enabled by means of the measuring device and the fundamental measuring method.

According to one embodiment, the measuring device is designed to ascertain the difference between the first and the second measured variable and to ascertain the rotational velocity of the shaft based on the difference.

Alternatively or additionally thereto, the measuring device can be designed to ascertain the total of the first and the second measured variable and to ascertain the torsion of the shaft (for example, to ascertain the torsional moment or torque applied to the shaft) based on the total.

Alternatively or additionally thereto, the measuring device can be designed to characterize the positioning of the measuring device in relation to the shaft based on the first and/or the second measured variable, for example to ascertain the distance between the magnetic field generator and/or sensor element and the shaft.

If the measuring device is embodied having four magnetic field detectors, the measuring device can be designed (for example, by means of the analysis device) to detect the difference with respect to amplitude or phase between the exciter signal and the third output signal as a third measured variable and/or between the exciter signal and the fourth output signal as a fourth measured variable. It can be provided, for example, that the measuring device is designed to detect the exciter signal, the third output signal, and the fourth output signal and also to ascertain the third and the fourth measured variable based on the detected signals.

The measuring device can thus be designed to detect the difference between the amplitude of the exciter signal and the amplitude of the third output signal as the third measured variable and to detect the difference between the amplitude of the exciter signal and the amplitude of the fourth output signal as the fourth measured variable, wherein the third and the fourth measured variables are provided by an amplitude difference. Alternatively or additionally thereto, the measuring device can be designed to detect the difference between the phase of the exciter signal and the phase of the third output signal as the third measured variable and to detect the difference between the phase of the exciter signal and the phase of the fourth output signal as the fourth measured variable, wherein the third and the fourth measured variables are provided by a phase difference.

If a current signal functions as the exciter signal, the third and the fourth output signal are preferably also current signals. If a voltage signal functions as the exciter signal, the third and the fourth output signal are preferably also voltage signals. However, it can also be provided—in particular for the case that phase differences are detected as the third and fourth measured variable—that the exciter signal is a current signal and the output signals are voltage signals, or that the exciter signal is a voltage signal and the output signals are current signals.

The measuring device can moreover be designed to ascertain the total of the third and the fourth measured variable. It can be provided that the measuring device is designed to ascertain the distance between the magnetic field generator and/or the sensor element and the shaft and/or to ascertain the torsion of the shaft based on the total of the first and the second measured variable and also on the total of the third and the fourth measured variable. It can thus be provided that the total of the third and the fourth measured variable is detected as a third channel by the measuring device. The measuring device can thus be designed, for example, to carry out a three-channel measurement, wherein the first signal channel is provided by the first measured variable, the second signal channel is provided by the second measured variable, and the third signal channel is provided by the total of the third and the fourth measured variable.

Alternatively or additionally thereto, the measuring device can be designed to ascertain the difference between the third and the fourth measured variable.

According to one embodiment, the measuring device comprises a flux conduction structure (for example, embodied as a flux conduction iron), wherein the magnetic field generator and each of the magnetic field detectors are arranged on a separate pole of the flux conduction structure. If the magnetic field generator and/or the magnetic field detectors are embodied as coils, for example, it can be provided that the respective coil is wound around the associated pole and/or the pole protrudes into the coil interior, so that the pole functions as a coil core of the coil. The flux conduction structure can be part of the sensor element. The flux conduction structure is used for bundling and guiding the magnetic flux.

If the measuring device is embodied having only two magnetic field detectors, the flux conduction structure can be formed, for example, E-shaped having three poles and a connecting web connecting the poles at the base thereof, wherein the magnetic field generator is arranged on the middle pole, the first magnetic field detector is arranged on one of the two outer poles, and the second magnetic field detector is arranged on the other of the two poles. If the measuring device is embodied having four magnetic field detectors, the flux conduction structure can be formed, for example, having a cross-shaped base having four cross arms (preferably of equal length), wherein a pole protruding at a right angle from the base is arranged on the intersection point and on each of the four endpoints of the cross-shaped base.

The magnetic coupling between the magnetic field generator, the shaft, and the magnetic field detectors can be improved by means of the flux conduction structure, whereby, for example, the signal quality can be improved and a lesser distance between the sensor and the measurement object (shaft) can be enabled. In the case of a high magnetic permeability provided by the measurement object (shaft) and a high level of coupling thus resulting between the magnetic field generator and the magnetic field detectors, a separate magnetic flux guiding by core materials and/or a flux conduction structure can optionally be omitted.

The flux conduction structure can be embodied, for example, from plate core materials (for example, transformer core plates), powder-metallurgy core materials (for example, powder cores of small grain size), amorphous core materials (for example, laminated or strip-embodied highly permeable metals), or fluid core materials (for example, ferrofluids). The conduction of the magnetic field by the flux conduction structure hinders the formation of stray fields and promotes the ratio of measurement magnetic field to stray magnetic field (i.e., the ratio of the magnetic field generated by the magnetic field generator to the magnetic field applied to the magnetic field detectors). In addition, the highly permeable flux conduction structure promotes the targeted and local introduction of the magnetic field into the measurement object and enables the implementation of greater distances between the sensor (flux conduction structure, magnetic field generator, and magnetic field detectors, for example in the form of coils) and the measurement object (shaft) in relation to the arrangement without flux conduction structure (for example, in the form of an air coil arrangement).

The measurement results supplied by the measuring device can be temperature-dependent, for example as a result of a temperature dependence of the properties of the shaft (in particular of the ferromagnetic shaft material) and/or a temperature dependence of the properties of the flux conduction structure. This temperature dependence can result, for example, in a thermal drift, which influences the first, second, third, and fourth measured variable, so that the accuracy of the measurement results can be improved by correction of such a temperature dependence. Alternatively thereto, the measurement accuracy can be improved by preventing such a temperature drift.

The magnetic Reynolds number and the interaction parameter can each be dependent on both the temperature-dependent electrical conductivity and also on the temperature-dependent relative permeability of the measurement object (the shaft). A change of the temperature (for example, the shaft temperature) can therefore result in a thermally-induced drift of the measurement system due to the measurement object. The sensor without measurement object can also have a thermally-related drift, depending on the technical embodiment. The use of a highly permeable flux conduction structure can cause a sensor drift, for example, due to its temperature-dependent electrical and also magnetic conductivity.

According to one embodiment, the measuring device comprises a flux conduction structure and a temperature control device for the temperature control of the flux conduction structure to a predetermined temperature. By means of the temperature control device, the temperature of the flux conduction structure can thus be set to a predetermined constant value and kept at this value. A temperature drift of the measurement results, which is caused by the temperature dependence of the material properties of the flux conduction structure, can thus be prevented. The temperature control unit can comprise, for example, a heating device and/or a cooling device.

According to a further embodiment, the measuring device comprises a temperature sensor for detecting the temperature. The temperature sensor can be, for example, designed and arranged (for example, on the sensor element) in such a way that the ambient temperature present in the surroundings of the measuring device is detected thereby. If the measuring device is formed having a flux conduction structure, the temperature sensor is preferably designed and arranged in such a way (for example, in physical contact with the flux conduction structure) that the temperature of the flux conduction structure is detected thereby. The temperature of the flux conduction structure is also referred to as the core temperature. It can be provided that the measuring device is designed to ascertain a correction parameter in dependence on the temperature detected by means of the temperature sensor and to characterize the torsion, the rotation, and/or the positioning of the shaft with incorporation of the correction parameter. It can be provided in particular that the measuring device is designed to ascertain the total of the first and the second measured variable and to ascertain the torsion of the shaft (for example, to ascertain the torsional moment or torque applied to the shaft) based on the total and the correction parameter.

According to a further embodiment, the measuring device is designed to apply multiple (i.e., two or more) chronologically periodically varying exciter signals having different frequencies to the magnetic field generator. The measuring device can be designed, for example, in such a way that it applies different exciter signals simultaneously to the magnetic field generator during the operation of the measuring device, wherein each of the exciter signals has a different frequency, and wherein the exciter signals are preferably synchronized with one another (i.e., each of the exciter signals is provided having a fixed phase shift in relation to each of the other exciter signals). As another example, the measuring device can be designed in such a way that it applies different exciter signals in succession to the magnetic field generator during operation of the measuring device, wherein each of the exciter signals has a different frequency. The measuring device can be designed in particular to detect the first and/or the second and/or the third and/or the fourth measured variable for each of the frequencies. It can be provided in particular that the measuring device is designed to detect the first and the second measured variable for each of the frequencies, to ascertain the total of the first and the second measured variable for each of the frequencies, and to ascertain the torsion of the shaft (for example, to ascertain the torsional moment or torque applied to the shaft) based on the multiple totals.

According to one embodiment, the measuring device is designed to apply (either simultaneously or sequentially and/or in chronological succession) a first exciter signal having a first frequency and a second exciter signal having a second frequency to the magnetic field generator. According to this embodiment, the measuring device is moreover designed to detect the first and second measured variable provided for the first frequency and to ascertain the total of the first and the second measured variable provided for the first frequency as the first total. Furthermore, the measuring device is designed to detect the first and second measured variable provided for the second frequency and to ascertain the total of the first and the second measured variable provided for the second frequency as the second total. According to this embodiment, the measuring device is moreover designed to ascertain the torsion of the shaft (for example, to ascertain the torsional moment or torque applied to the shaft) based on the first and the second total.

The temperature dependence of the first, second, third, and fourth measured variable is frequency-dependent. Therefore, a temperature-related deviation or corruption of the measurement results can be ascertained and compensated for by means of detection of the respective measured variables for different frequencies, for example by means of a system-invariant transfer function $G(\Omega_i)$, which can be ascertained, for example, by computer or experimentally for the measuring device (in this case, G denotes the transfer function and $\Omega_i$, where i=1 to n, denotes the different frequencies of the exciter signals). In this case, deviations caused both by the measuring device (for example, the flux conduction structure) and also by the shaft can be compensated for.

According to a further aspect of the invention, an arrangement is provided for characterizing the torsion state and/or the rotation state and/or the positioning of a shaft, wherein the arrangement is also referred to hereafter as a measuring arrangement. The arrangement comprises the shaft to be characterized and the measuring device.

During the operation of the measuring device, the magnetic field generator and the magnetic field detectors of the measuring device are arranged adjacent to the shaft to be characterized, e.g., by the sensor element of the measuring device being arranged adjacent to the shaft. The shaft to be characterized comprises a shaft longitudinal axis. The positioning of the magnetic field generator and the magnetic field detectors in relation to the shaft is described hereafter on the basis of a radial plane of the shaft, wherein a radial plane is understood as a plane which is spanned by the shaft longitudinal axis and a radius of the shaft.

The magnetic field generator is arranged adjacent to the shaft in such a way that it is intersected by a radial plane of the shaft and/or is located in this radial plane, wherein this radial plane is also referred to hereafter as an exciter radial plane or exciter plane (since it identifies the radial plane in which the magnetic field generator functioning as the exciter is arranged). The radial direction by which the exciter radial plane is spanned (together with the direction of the shaft longitudinal axis) is also referred to as the exciter plane radial direction.

The magnetic field generator is preferably designed and arranged in such a way that the magnetic field generated thereby is symmetrical with respect to the exciter radial plane. The magnetic field generator can be designed and arranged, for example, in such a way that the magnetic field generated thereby is rotationally symmetrical with respect to the exciter plane radial direction.

If the magnetic field generator is embodied as an exciter coil and/or the magnetic field detectors are embodied as receiver coils, they can be arranged, for example, in such a way that the coil axes thereof are parallel to the exciter plane radial direction. The exciter coil is preferably arranged in such a way that the exciter coil axis is perpendicular to the shaft longitudinal axis and intersects the shaft longitudinal axis (in its extension). Moreover, if the magnetic field detectors are additionally formed as receiver coils, the receiver coils are preferably arranged in such a way that the receiver coil axes thereof are parallel to the exciter coil axis.

The first and the second magnetic field detector are arranged adjacent to the shaft in such a way that the first magnetic field detector is arranged on one side of the exciter radial plane, and the second magnetic field detector is arranged on the other side of the exciter radial plane. The first magnetic field detector and the second magnetic field detector are thus arranged on different sides of the exciter radial plane. In other words—with respect to the normal direction of the exciter radial plane as the vertical direction—the magnetic field generator is arranged at the height of the exciter radial plane, one of the two magnetic field detectors (for example, the first magnetic field detector) is arranged above the exciter radial plane, and the other of the two magnetic field detectors (for example, the second magnetic field detector) is arranged below the exciter radial plane. The first and the second magnetic field detector are thus arranged in particular in such a way that the sensor main axis is not parallel to the shaft longitudinal axis, and/or the first and the second magnetic field detector are not arranged in the exciter radial plane (i.e., they are not intersected by the exciter radial plane).

If the measuring device is embodied having four magnetic field detectors, it can be provided that the third and the fourth magnetic field detector are arranged with respect to the exciter radial plane extending through the magnetic field generator in such a way that the exciter radial plane extends through the third and the fourth magnetic field detector.

Alternatively thereto, if the measuring device is embodied having four magnetic field detectors, it can be provided that the third and the fourth magnetic field detector are arranged with respect to the exciter radial plane extending through the magnetic field generator in such a way that the third magnetic field detector is arranged on the same side of the exciter radial plane as the first magnetic field detector, and the fourth magnetic field detector is arranged on the same side of the exciter radial plane as the second magnetic field detector. According to this embodiment, the third and the fourth magnetic field detector are thus arranged in such a way that they are not intersected by the exciter radial plane.

The first and the second magnetic field detector are preferably arranged in such a way that the sensor main axis (which extends from the first to the second magnetic field detector) is perpendicular to the exciter plane radial direction. If the measuring device is embodied having four magnetic field detectors, the third and the fourth magnetic field detector can moreover be arranged in such a way that the sensor secondary axis (which extends from the third to the fourth magnetic field detector) is perpendicular to the exciter plane radial direction. In general, it can be provided that all magnetic field detectors of the measuring device are arranged in a common plane which is perpendicular to the exciter plane radial direction.

According to one embodiment, the first and the second magnetic field detector are arranged in such a way that the sensor main axis is perpendicular to the exciter radial plane, so that the sensor main axis extends perpendicularly to the shaft longitudinal axis (i.e., an angle of 90° is present between the directional vectors of the sensor main axis and the shaft longitudinal axis). A symmetrical arrangement of the first and the second magnetic field detector with respect to the shaft is thus enabled. According to this embodiment, if the measuring device is embodied having four magnetic field detectors, the third and the fourth magnetic field detector can moreover be arranged, for example, in such a way that the sensor secondary axis is perpendicular to the sensor main axis and perpendicular to the exciter plane radial direction, so that the sensor secondary axis is located within the exciter radial plane (so that the third and the fourth magnetic field detector are arranged at the height of the exciter radial plane with respect to the normal direction of the exciter radial plane as the vertical direction).

According to another embodiment, the first and the second magnetic field detector are arranged in such a way that the sensor main axis is perpendicular to the exciter plane radial direction and forms an angle of 45° with the exciter radial plane, so that the sensor main axis also forms an angle of 45° with the shaft longitudinal axis (i.e., an angle of 45° is present between the directional vectors of the sensor main axis and the shaft longitudinal axis). This alignment of the sensor main axis is particularly relevant for the embodiment of the measuring device having four magnetic field detectors (see below). According to this embodiment, if the measuring device is embodied having four magnetic field detectors, the third and the fourth magnetic field detector can moreover be arranged, for example, in such a way that the sensor secondary axis is perpendicular to the sensor main axis and perpendicular to the exciter plane radial direction, so that the sensor secondary axis also forms an angle of 45° with the exciter radial plane.

The magnetic field generator and all magnetic field detectors of the measuring device are preferably arranged on the same side of the shaft, for example by the sensor element of the measuring device being arranged laterally adjacent to the shaft. In other words, the magnetic field generator and all magnetic field detectors of the measuring device are arranged preferably in the same half-space with respect to a plane extending through the shaft longitudinal axis (i.e., on the same side of this plane). By way of such a one-sided arrangement of the measuring device with respect to the shaft, the measuring device can be positioned variably with respect to the shaft with a small space requirement. In particular, the arrangement can be designed in such a way that the shaft is not arranged between the magnetic field generator and one of the magnetic field detectors. The measuring device can thus be formed, for example, in a space-saving manner having small dimensions.

According to one embodiment, the magnetic field generator and the magnetic field detectors are designed and arranged in such a way that the distance between the magnetic field generator and at least one of the magnetic field detectors is less than the diameter of the shaft to be characterized. The measuring device can be designed, for example, in such a way that the distance between the magnetic field generator and the first magnetic field detector and/or the distance between the magnetic field generator and the second magnetic field detector and/or the distance between the magnetic field generator and the third magnetic field detector and/or the distance between the magnetic field generator and the fourth magnetic field detector is less than the diameter of the shaft to be characterized. A high measurement accuracy is thus additionally assisted with compact sensor embodiment.

If the magnetic field generator and/or the magnetic field detectors are embodied as coils, it can be provided that the coils are formed in such a way that the cross section (internal cross section and/or external cross section) of the coils is less than the cross section of the shaft, for example the diameter (internal diameter and/or external diameter) of the coils is less than the diameter of the shaft. A high measurement accuracy is thus additionally assisted with compact sensor embodiment.

Alternatively or additionally, the measuring device can be designed in such a way that the distance between the first and the second magnetic field detector is less than the diameter of the shaft. Moreover, the measuring device can be designed in such a way that the distance between the third and the fourth magnetic field detector is less than the diameter of the shaft.

For some possible fields of application (automotive, special applications), it can be provided that the sensor element having the magnetic field generator and the magnetic field detectors is constructed in planar technology, wherein the magnetic field generator and/or the magnetic field detectors can, for example, either be applied in the form of coil turns as 2D coils to a printed circuit board or can be constructed as 3D coils via layering technology. Such coils can be permeated, for example, by printed or vapor-deposited or inserted highly permeable flux conduction structures.

According to a further aspect of the invention, a method is provided for characterizing and/or measuring the torsion and/or the rotation and/or the positioning of a shaft, wherein the method is also referred to hereafter as a measuring method. The features described above with reference to the measuring device and the measuring arrangement apply analogously to the measuring method, so that the corresponding embodiments of the measuring method are only briefly discussed hereafter and otherwise reference is hereby made to the corresponding explanations with respect to the measuring device and the measuring arrangement.

According to the measuring method, a chronologically periodically varying magnetic field which at least partially permeates the shaft (for example, a magnetic field having a chronologically periodically varying field strength) is generated, by a chronologically periodically varying electrical exciter signal being applied to a magnetic field generator, wherein the magnetic field at least partially or superficially penetrates the shaft. The magnetic field is modified by the shaft to form an overall magnetic field. In a next method step, a detection is performed of the difference with respect to amplitude or phase between the exciter signal and a first electrical output signal, which represents the strength of the modified magnetic field at a first position, as a first measured variable and between the exciter signal and a second electrical output signal, which represents the strength of the modified magnetic field at a second position, as a second measured variable. The first and the second position are arranged in such a way that they are not located in the same radial plane of the shaft. In a next method step, the total of the first and the second measured variable and/or the difference between the first and the second measured variable is ascertained.

The positioning of the first position corresponds to that of the first magnetic field detector, the positioning of the second position corresponds to that of the second magnetic field detector. Therefore, the features explained above with reference to the positioning of the first or the second magnetic field detector, respectively, apply similarly with respect to the positioning of the first and the second position in relation to the magnetic field generator and in relation to the shaft.

It can be provided in particular that the magnetic field generator is arranged between the first and the second position. Moreover, it can be provided that a first magnetic field detector is arranged at the first position and a second magnetic field detector is arranged at the second position according to the above explanations, and the first output signal is detected by means of the first magnetic field detector and the second output signal is detected by means of the second output detector.

The magnetic field generator can be designed and arranged, for example, as explained above with reference to the measuring device and the measuring method.

According to one embodiment, the measuring method moreover includes the detection of the difference with respect to amplitude or phase between the exciter signal and a third electrical output signal, which represents the strength of the modified magnetic field at a third position, as a third measured variable, and between the exciter signal and a fourth electrical output signal, which represents the strength of the modified magnetic field at a fourth position, as a fourth measured variable. According to this embodiment, an ascertainment of the total of the third and the fourth measured variable and/or an ascertainment of the difference between the third and the fourth measured variable is moreover performed. The connecting line between the third and the fourth position is preferably perpendicular to the connecting line between the first and the second position.

The positioning of the third position corresponds to that of the third magnetic field detector, the positioning of the fourth position corresponds to that of the fourth magnetic field detector. Therefore, the features explained above with reference to the positioning of the third or fourth magnetic field detector, respectively, apply similarly with respect to the positioning of the third and the fourth position in relation to the magnetic field generator, in relation to the shaft, and in relation to the first and second position.

It can be provided in particular that the magnetic field generator is arranged between the third and the fourth position. Moreover, it can be provided that a third magnetic field detector is arranged at the third position and a fourth magnetic field detector is arranged at the fourth position according to the above explanations, and the third output signal is detected by means of the third magnetic field detector and the fourth output signal is detected by means of the fourth output detector.

In that different operating parameters of the shaft (torsion, rotation, and location parameters) can be detected simultaneously by means of the described functional principle, a multifunction sensor arrangement and method for the contactless determination of operating parameters such as rotational velocity (tangential velocity or angular velocity), effective torque (torsion), transmitted mechanical power, efficiency, and also for the contactless location analysis on drive parts (in particular shafts) having ferromagnetic parts (for example, on ferromagnetic drive parts or ferromagnetically laminated and/or coated drive parts) can be provided. In particular, a detection of the operating parameters in real time is enabled by means of the described functional principle. The shaft comprises ferromagnetic material, for example iron, steel, nickel, nickel alloys, etc., and can, for example, consist completely of ferromagnetic material or can be coated using ferromagnetic material. The shaft can be, for example, a CFRP shaft, which is coated using a layer of ferromagnetic and electrically conductive material (wherein CFRP denotes carbon-fiber reinforced polymer). Because of the contactless measurement, the described arrangement is suitable for special usage conditions (high temperatures, lubricants, and abrasives) in heavy machinery construction, in conveyance and transportation industries, and also in general for detecting the mentioned parameters, wherein the shaft surface does not have to be treated or influenced in any way. Due to the incorporation of the aspect of the safety-relevant operating state monitoring, the scope of application of this technology is expanded to applications of the described arrangement for ultravacuum facilities or centrifuge technology. As a result of the technical-physical relationships, an application of the multifunction system in the automotive sector is conceivable by way of miniaturization of the functional individual elements.

One advantage of the described arrangement and the fundamental measurement principle is overcoming the previously unsolved problems of material-specific hysteresis effects and also limiting drift and interfering influences in static and dynamic operation. The basic principle of the (multifunction) sensor is electromagnetic and therefore contactless in nature. A magnetic field which is applied to the ferromagnetic drive element is compared to a received magnetic field which is composed of the applied field and an induced magnetic field. The received magnetic field can be modulated and/or varied by influencing variables such as the tangential velocity of the shaft, the effective torque (torsion), or the location of the measurement object (shaft). A relative comparison of the applied and the received field discloses the effect of the mentioned parameters on the measurement object in the amplitude and phase change. By means of the magnetic field detectors, the torque-dependent and/or speed-dependent amplitude change or phase shift between the introduced exciter signal and the received output signals can be detected. The effects or actions to be measured effectively originate from a coefficient of the system, which is composed as a product of the contributions such as magnetic permeability, electrical conductivity, and velocity of the measurement object. The coefficient has the name "magnetic Reynolds number" in magneto-dynamics. The velocity measurement is based on the movement of the conductive body in a magnetic field externally applied to the measurement object (shaft), while the torsion effect results from the change of the magnetic permeability of the measurement object. The magnetic Reynolds number $R_m$ and also the interaction parameter S are each dependent on the temperature-dependent electrical conductivity and also on the temperature-dependent relative permeability of the measurement object (the shaft). The magnetic Reynolds number characterizes the velocity measurement, the interaction parameter characterizes the torsion measurement. A compensation can be provided as a result of the temperature dependence of the magnetic permeability and the electrical conductivity. The location analysis on the drive element (shaft) can be implemented by a measurement coupled to the detection of the shaft velocity and torsion. Since the radius of the drive element or the shaft is known, the angular velocity can be computed from the tangential velocity. After completed separation, the individual contributions of the changes in the amplitude response and phase response are converted by mathematical-physical relationships, so that the angular velocity [$ms^{-1}$], the torsion [Nm], the transmitted mechanical power [watts], the efficiency, and the location [m] can be represented in the original unit and measurement systems thereof.

A method and an arrangement for the contactless detection of the parameters torsion, angular velocity, transmitted mechanical power, efficiency, and location analysis of a drive element as a multi-functional principle are thus provided, inter alia, by the described functional principle. The determination of the transmitted mechanical power on the measurement object (shaft) results as a product of the ascertained angular velocity and the effective torque. The efficiency of a working machine is computed from the quotient of the output power to the received power. The relative location measurement between measurement object (shaft) and the sensor results from the chronological high-resolution detection of the amplitude or the phase on the basis of Xs and is explained in greater detail hereafter. The relative location measurement corresponds to an inductive distance measurement. A manipulation of the surface or morphology (tapering, structuring, OF layer, coding) is not necessary for materials having ferromagnetic properties. For drive elements without ferromagnetic properties (for example, CFRP shafts), a coating using a ferromagnetic material, for example nickel, etc., in the range of several nanometers or micrometers thickness can be provided for the application conditioning.

The ferromagnetic measurement object (shaft) changes the coupling of the magnetic field generator and the magnetic field detectors to one another in dependence on the location of the sensor (distance sensor—shaft), the rotational velocity, and finally the forces acting in the measurement object (torsion/compression/tension). The amplitude and phasing distribution of the magnetic field can be changed by a location, velocity, or tension change (torsion/compression/tension) in the material. A relative comparison of the applied and the received field discloses, in the amplitude and phase change, the effect of the mentioned parameters on the measurement object. The possibility of the measurement separate from one another of the parameters angular velocity and torsion may be described by two dimensionless coefficients characteristic of the measuring system. The so-called magnetic Reynolds number $R_m$ is decisively significant for the contactless determination of the angular velocity of the shaft, while the effect of the torsion tension on the measurement object is described by a change of the interaction parameter S.

The described functional principle relates, inter alia, to the possibility of a contactless detection of the operating parameters, such as torsion, angular velocity, and location/position of the shaft. In addition to the detection of the mentioned parameters, the following embodiments are moreover possible:

Due to the separate detection of angular velocity and torsion (torque), a representation of the transmitted mechanical power in real time is possible, In addition to the determination of the transmitted mechanical power in real time, a determination of the machine efficiency is possible, The detection of the angular velocity is sign-oriented, i.e., a determination of right-handed and left-handed rotation is enabled by the inductive measuring method, A temporary high-resolution location measurement enables a contactless determination of vibrations of the drive element, and For the case of a very slow passage of the driveshaft through the detection volume of the sensor, a contactless contour measurement can be carried out.

BRIEF DESCRIPTION OF THE SEVERAL VIEWS OF THE DRAWING

The invention is explained hereafter on the basis of exemplary embodiments with reference to the appended figures, wherein identical or similar features are provided with identical reference signs; in the schematic figures.

DESCRIPTION OF THE INVENTION

Figure 1A:
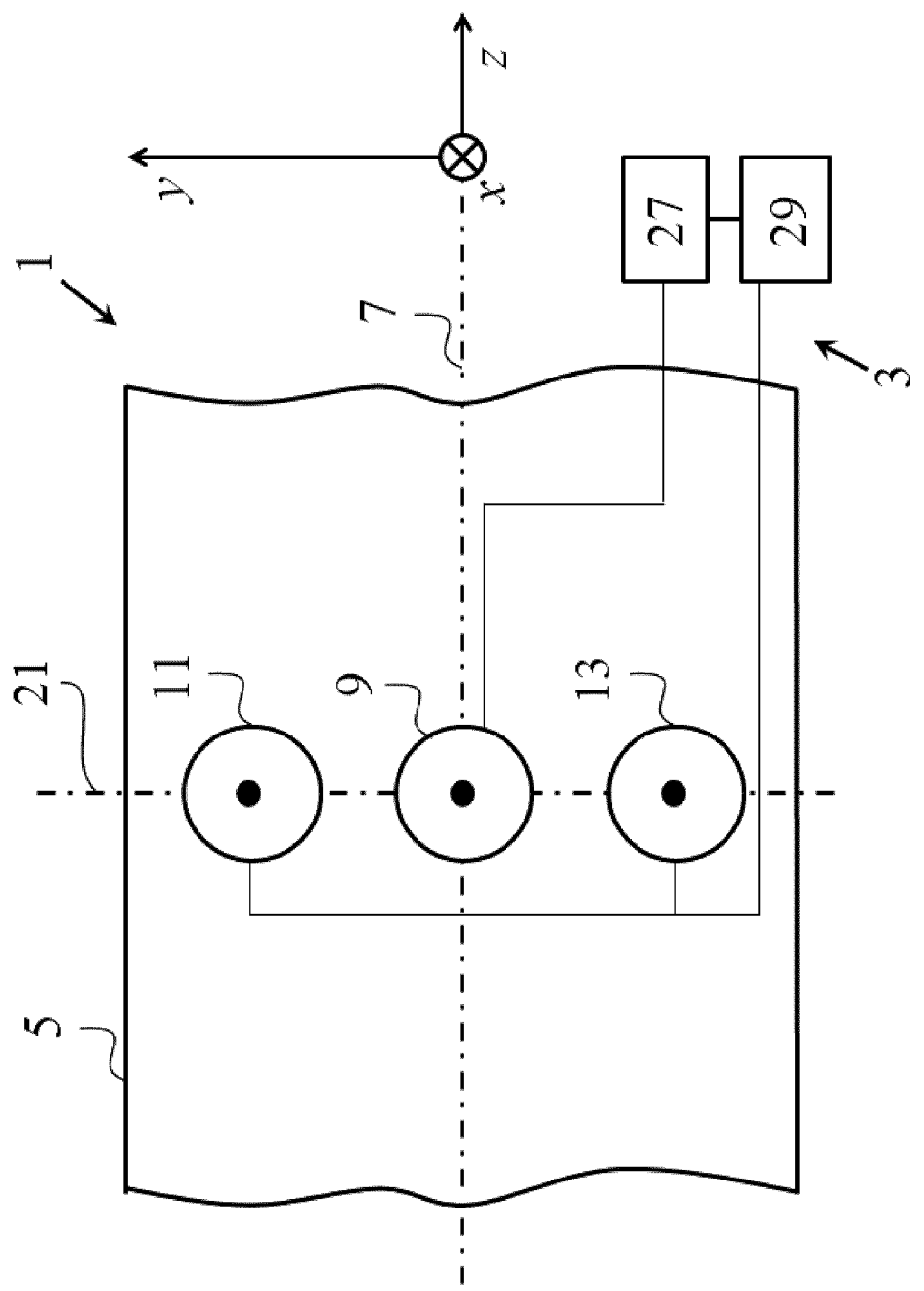
FIGS. 1A, 1B show a measuring arrangement according to one embodiment having a measuring device having two magnetic field detectors.
Figure 1B:
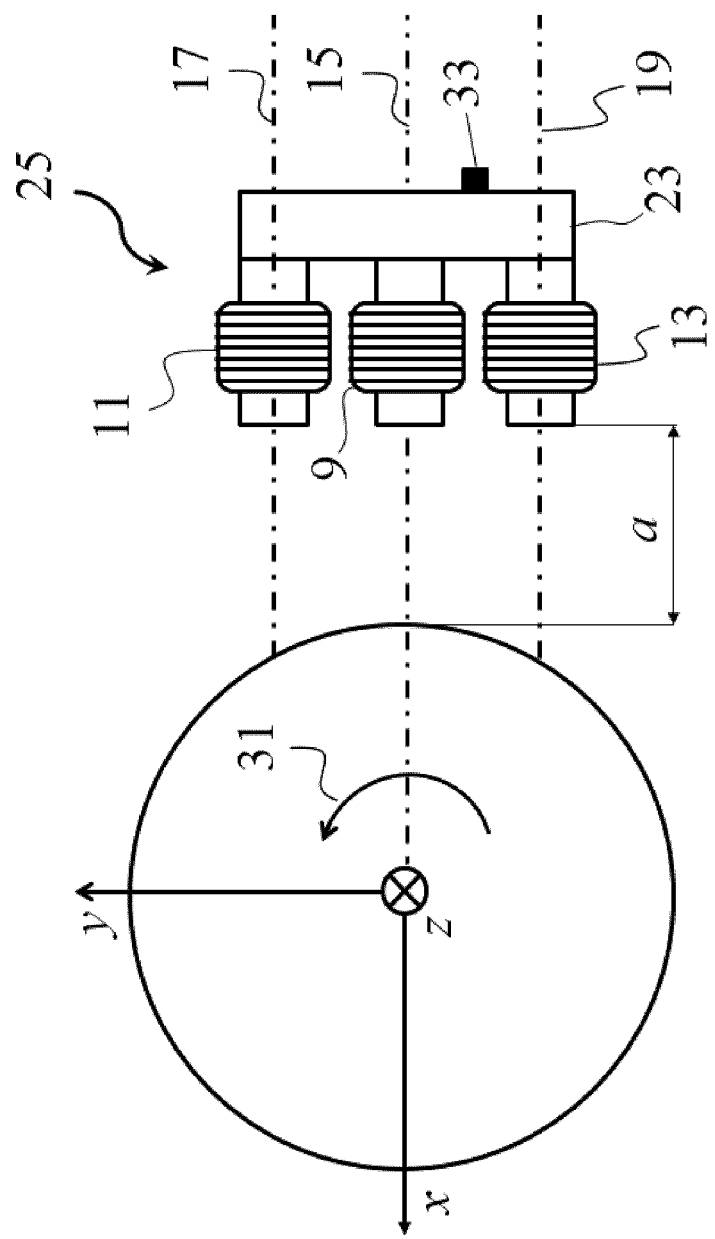

FIGS. 1A and 1B show a measuring arrangement 1 according to one embodiment while carrying out a measuring method according to one embodiment. The measuring arrangement 1 comprises a measuring device 3 and a shaft 5. The shaft longitudinal axis 7 coincides with the z direction of the xyz coordinate system shown in the figures. The shaft 5 at least partially consists of ferromagnetic and electrically conductive material. As an example, in the embodiment according to FIGS. 1A and 1B, the shaft 5 is a hollow shaft or solid shaft, which consists of a ferromagnetic and electrically conductive material.

The measuring device 3 comprises a magnetic field generator 9, a first magnetic field detector 11, and a second magnetic field detector 13. The magnetic field generator 9 is embodied as an example as a coil, which is also referred to as an exciter coil 9. However, the magnetic field generator can also be designed in the form of another magnetic-field-generating device. The first 11 and the second 13 magnetic field detector are each embodied as a coil as an example, which are also referred to as a first receiver coil 11 and second receiver coil 13. The first and the second magnetic field detector can also be designed in the form of another magnetic-field-sensitive detector, however, for example as a Hall detector. The exciter coil 9 is arranged between the first receiver coil 11 and the second receiver coil 13.

The xz plane of the xyz coordinate system shown in the figures forms a radial plane of the shaft 5. The exciter coil 9 is arranged in such a way that it is intersected by the xz plane and/or is located in the xz plane; therefore the radial plane formed by the xz plane is also referred to as the exciter radial plane. The exciter radial plane is thus spanned (together with the shaft longitudinal axis) by the x direction as the exciter plane radial direction. The exciter coil 9 is arranged in such a way that its coil axis 15 is parallel to the x axis, wherein the exciter coil axis 15 is perpendicular to the shaft longitudinal axis 7 and (in its extension) intersects the shaft longitudinal axis 7. The magnetic field (not shown) generated by the exciter coil 9 is rotationally symmetrical with respect to the exciter coil axis 15.

The first receiver coil 11 is arranged on one side of the exciter radial plane (namely on the side of the xz plane having positive y values), the second receiver coil 13 is arranged on the other side of the exciter radial plane (namely on the side of the xz plane having negative y values). The first 11 and second 13 receiver coil are arranged in such a way that the receiver coil axes 17 or 19 thereof, respectively, extend in parallel to the exciter coil axis 15 (and thus in parallel to the x axis or the exciter plane radial direction), wherein the three coil axes 15, 17, 19 all extend in a plane which is parallel to the xy plane. The sensor main axis 21, which is provided by the connecting line between the first 11 and the second 13 receiver coil, extends in parallel to the y axis and perpendicular to the exciter radial plane (xz plane). An angle of 90° is thus provided between the directional vector of the shaft longitudinal axis 7 (z direction) and the directional vector of the sensor main axis 21 (y direction).

The exciter coil 9 and also the first 11 and the second 13 receiver coil are formed identically to one another. The first 11 and the second 13 receiver coil are arranged equidistantly and symmetrically on both sides of the exciter coil 9 along the sensor main axis 21. The exciter coil 9 is thus arranged in the middle between the first 11 and the second 13 receiver coil.

The measuring device 3 can optionally comprise a flux conduction structure 23 (not shown in FIG. 1A). According to FIG. 1B, the flux conduction structure 23 is formed E-shaped, wherein the exciter coil 9 is arranged on the middle pole of the flux conduction structure 23 and the two receiver coils 11, 13 are arranged on the two outer poles of the flux conduction structure 23. The exciter coil 9 and the receiver coils 11, 13 (and also optionally the flux conduction structure 23) form a sensor element 25 of the measuring device. During the operation of the measuring device 3, the sensor element 25 is arranged laterally adjacent to the shaft 1.

The distance between the exciter coil 9 and the first receiver coil 11 is less than the diameter of the shaft 5. The distance between the exciter coil 9 and the second receiver coil 13 is also less than the diameter of the shaft 5. The internal cross section and the external cross section of each of the coils 9, 11, 13 is less than the cross section of the shaft 5. Moreover, the distance between the first receiver coil 11 and the second receiver coil 13 is less than the diameter of the shaft 5.

The measuring device 3 comprises an electrical power source 27, which is connected to the exciter coil 9 and by means of which a chronologically periodically varying electrical exciter signal is applied to the exciter coil 9 during operation of the measuring device 3. As an example, the measuring device 3 is designed by means of the power source 27 for applying a harmonic alternating current of a predetermined frequency to the exciter coil 9, wherein the alternating current is used as the exciter signal. Alternatively thereto, the AC voltage accompanying the alternating current can be used as the exciter signal. A magnetic field (not shown) is generated by the exciter coil 9 due to the exciter signal, which interacts with the ferromagnetic and electrically conductive material of the shaft 5, whereby a modified overall magnetic field is generated.

The modified overall magnetic field induces a voltage, which is accompanied by an electric current, in each of the receiver coils 11, 13. The measuring device 3 is designed to detect the electric current resulting at the first receiver coil 11 as a first output signal and to detect the current resulting at the second receiver coil 13 as a second output signal. Alternatively thereto, the measuring device 1 can also be designed to detect the electric voltage resulting at the first receiver coil 11 as a first output signal and to detect the voltage resulting at the second receiver coil 13 as a second output signal. The measuring device 3 comprises as an example an analysis device 29, which is connected to the first 11 and the second 13 receiver coil and is designed to detect the output signals.

The analysis device 29 is connected to the electrical power source 27. The measuring device 3 is designed to detect the difference with respect to amplitude and/or phase between the exciter signal and the first output signal as a first measured variable and between the exciter signal and the second output signal as a second measured variable by means of the analysis device 29.

The measuring device 3 is designed to ascertain the total of the first and the second measured variable by means of the analysis device 29. The measuring device 3 is moreover designed to ascertain the difference between the first and the second measured variable by means of the analysis device 29. Moreover, the measuring device 3 is designed to characterize the torsion state, the rotation state, and the positioning of the shaft based on the ascertained total and the ascertained difference, as explained hereafter.

The first measured variable $X_{E/R1}$ and the second measured variable $X_{E/R2}$ can be written as follows:

$$X_{E/R1} = B_E - B_{R1} = X_S + X_R - X_T \tag{1}$$

$$X_{E/R2} = B_E - B_{R2} = X_S - X_R - X_T, \tag{2}$$

wherein the index E denotes the magnetic field generator 9 (here: the exciter coil 9), the index R1 denotes the first magnetic field detector 11 (here: the first receiver coil 11), the index R2 denotes the second magnetic field detector 13 (here: the second receiver coil 13), $B_E$ denotes the reference variable of the exciter signal, $B_{R1}$ denotes the reference variable of the first output signal, and $B_{R2}$ denotes the reference variable of the second output signal, wherein the reference variable is either the amplitude or the phase of the respective signal.

$X_{E/R1}$ denotes the first measured variable, which corresponds to the difference between the reference variable of the exciter signal and the reference variable of the first output signal (i.e., the amplitude difference or the phase difference between the exciter signal and the first output signal). $X_{E/R2}$ denotes the second measured variable, which corresponds to the difference between the reference variable of the exciter signal and the reference variable of the second output signal (i.e., the amplitude difference or the phase difference between the exciter signal and the second output signal). The first and second measured variable are each composed of a static contribution $X_S$, which is dependent on the distance a between the magnetic field generator 9 and/or the sensor element 25 and the shaft 5, a contribution $X_R$ dependent on the rotational velocity of the shaft 5, and a contribution $X_T$ dependent on the torsion of the shaft 5. The required distance of the sensor element from the measurement object (shaft) is strongly dependent on the magnetic coupling between the sensor element and the measurement object (shaft) and typically moves in the range of several millimeters. A suitable measurement distance a has to be set in dependence on the magnetic conductivity of the measurement object. The smaller the measurement distance a can be selected, the better are the signal quality and dynamics, which is required for the most interference-free possible measurement signal analysis.

With the present symmetrical arrangement of the first 11 and the second 13 magnetic field detector with respect to the shaft 5, the contribution $X_S$ is equal on both channels. It can thus be ensured via the contribution $X_S$ that the first 11 and the second 13 magnetic field detector (and/or the sensor element 25 of the measuring device 3) are arranged symmetrically with respect to the shaft 5.

A rotation of the shaft 5 is accompanied by an increase of the detected reference variable difference by a contribution $X_R$ dependent on the rotational velocity on one of the two measurement channels and a reduction of the reference variable difference by the same contribution $X_R$ on the other of the two channels. For the case that the tangential velocity of the shaft points from the second 13 toward the first 11 magnetic field detector on the side of the shaft 5 facing toward the magnetic field generator 9 (illustrated in FIG. 1B by the arrow 31, which indicates the associated rotational direction), $X_R$ is positive, wherein the first channel or the first measured variable $X_{E/R1}$ increases by the (rotational-velocity-dependent) absolute value $X_R$ and the second channel or the second measured variable $X_{E/R2}$ decreases by the same absolute value $X_R$. For the case that the tangential velocity of the shaft points from the first 11 toward the second 13 magnetic field detector (not shown) on the side of the shaft 5 facing toward the magnetic field generator 9, $X_R$ is positive, wherein the first channel or the first measured variable $X_{E/R1}$ decreases by the absolute value $X_R$ and the second channel or the second measured variable $X_{E/R2}$ increases by the same absolute value $X_R$. The running direction of the shaft 5 thus determines the sign with which the contribution $X_R$ is incorporated into the first and the second measured variable, whereby the ascertainment of the running or rotational direction of the shaft 5 is enabled. The measuring device 3 can be designed, for example, in such a way that it is evaluated by it as the presence of a first rotational direction if the first measured variable is greater than the second measured variable, and it is evaluated by it as the presence of a second rotational direction if the second measured variable is greater than the first measured variable, wherein the first rotational direction is opposite to the second rotational direction.

A torsion of the shaft 5, which can be provided both with resting and also with rotating shaft, is expressed in a change of the magnetization of the shaft 5 induced by the exciter magnetic field and is accompanied by an identical change of the detected reference variable difference by a contribution $X_T$, which is dependent on the torsion, on both channels.

The total $\Sigma X_{12}$ of the first and the second measured variable results as $$\Sigma X_{12} = X_{E/R1} + X_{E/R2} = 2(X_S - X_T), \quad (3)$$

and the difference $\Delta X_{12}$ between the first and the second measured variable results as $$\Delta X_{12} = X_{E/R1} - X_{E/R2} = 2X_R, \quad (4)$$

so that, since the static contribution $X_S$ is independently ascertainable (see below), by means of calculation of the total and the difference, a separation and ascertainment of the rotational-velocity-dependent contribution $X_R$ and the torsion-dependent contribution $X_T$ is enabled. Accordingly, the contribution $X_R$ dependent on the rotational velocity can be ascertained as $$X_R = \Delta X_{12}/2, \quad (5)$$

and the contribution $X_T$ dependent on the torsion can be ascertained as $$X_T = X_S - \Sigma X_{12}/2. \quad (6)$$

The static contribution $X_S$ can be ascertained, for example, by measurement in the idle state of the shaft without rotation and without torsion of the shaft or can be set identical to zero.

The contribution $X_R$ dependent on the rotational velocity $v_R$ can thus be ascertained by the measuring device 3 according to equation (5) on the basis of the difference between the first and the second measured variable, and based on the provided contribution $X_R$, the rotational velocity $v_R$ can be ascertained, wherein $v_R$ can be provided by the tangential velocity (in the unit m/s) or the angular velocity (in the unit 1/s). At known diameter of the shaft, the tangential velocity and the angular velocity may be converted into one another without problems. The rotational velocity $v_R$ can be ascertained by the measuring device 3, for example, by a reference characteristic being stored in the measuring device which associates the rotational velocity $v_R$ with each value of $X_R$, for example by means of an association function $v_R = v_R(X_R)$, which associates an associated rotational velocity $v_R$ as a function value with a predetermined value of $X_R$ as a function argument. Such a reference characteristic or association function can be ascertained, for example, by means of a calibration, i.e., by means of targeted setting of known rotational velocities and subsequent measurement of the value of $X_R$ provided at the respective rotational velocity. During operation of the measuring device 3, a rotational velocity $v_R$ can then be associated with a detected value $X_R$ by means of comparison of the detected value $X_R$ to such a reference characteristic.

Accordingly, the measuring device 3 can be designed, for example, to ascertain the difference $\Delta X_{12}$ between the first and the second measured variable and to ascertain the rotational velocity of the shaft 5 based on the difference.

Furthermore, the contribution $X_T$ dependent on the torsion can be ascertained by the measuring device 3 according to equation (6) on the basis of the total of the first and the second measured variable (and on the basis of the known static contribution $X_S$), and based on the provided contribution $X_T$, for example, the torque or torsional moment $M_T$ applied to the shaft can be ascertained (in the unit Nm).

The torsional moment $M_T$ can be ascertained, for example, by a reference characteristic being stored in the measuring device, which associates the associated value of the torsional moment $M_T$ with each value of $X_T$, for example by means of an association function $M_T = M_T(X_T)$, which associates an associated torsional moment $M_T$ as a function value with a predetermined value of $X_T$ as a function argument. Such a reference characteristic or association function can be ascertained, for example, by means of a calibration, i.e., by means of targeted setting of known torsional moments and subsequent measurement of the value of $X_T$ provided at the respective torsional moment. During the operation of the measuring device, a torsional moment $M_T$ can then be associated with a detected value $X_T$ by means of comparison of the detected value $X_T$ with such a reference characteristic.

Accordingly, the measuring device 3 can be designed, for example, to ascertain the total $\Sigma X_{12}$ of the first and the second measured variable and to ascertain the torsion of the shaft (for example, to ascertain the torque or torsional moment applied to the shaft) based on the total.

Furthermore, the measuring device can be designed to characterize the positioning of the measuring device in relation to the shaft based on the first and the second measured variable, for example to ascertain the distance between the magnetic field generator and/or sensor element and the shaft and/or to ascertain whether the first and the second magnetic field detector and/or the sensor element are arranged symmetrically with respect to the shaft.

The measuring device can be designed, for example, to ascertain the first and the second measured variable in the idle state of the shaft without rotation and without torsion of the shaft. Furthermore, the measuring device can be designed in such a way that it is evaluated by it as symmetrical positioning of the first and the second magnetic field detector with respect to the shaft (and thus as correct positioning) if the first measured variable is equal to the second measured variable in the idle state of the shaft.

Moreover, the measuring device 3 can be designed to ascertain $X_S$, for example by means of a measurement in the idle state of the shaft 5 without rotation and torsion. The measuring device 3 can furthermore be designed to ascertain the distance a between the magnetic field generator 9 and/or the sensor element 25 and the shaft 5 based on the ascertained value of $X_S$ (for example, by means of comparison of an ascertained value for Xs to a corresponding reference characteristic similarly to the above procedure explained with reference to $X_T$ and $X_R$).

In that the measuring device 3 is designed to detect the first measured variable $X_{E/R1}$ and the second measured variable $X_{E/R2}$ and to ascertain the total $\Sigma X_{12}$ of the first and the second measured variable and/or to ascertain the difference $\Delta X_{12}$ between the first and the second measured variable, therefore $X_R$, $X_T$, and $X_S$ can be ascertained by the measuring device 3 and inferences can be drawn therefrom about the rotation state of the shaft 5 and the positioning of the shaft 5 in relation to the sensor element 25.

A conversion of the reference or contribution variables $X_S$ into a location specification (in the unit m), $X_T$ into a torsion specification (in the unit Nm), and $X_R$ into a velocity specification (unit m/s or 1/s) can be, for example, by a calibration of these variables to known measured variables such as location and/or location change, torsion, and velocity and/or by back calculation of these measured variables into the mechanical variables location (in m), torsion (in Nm), and rotational velocity (in m/s or 1/s), wherein the temperature can moreover be incorporated as a parameter.

Furthermore, the measuring device 3 can be designed to ascertain the mechanical power P transmitted by the shaft according to $$P=M_T(X_T)\cdot\omega(X_R), \qquad (7)$$

wherein ω denotes the angular velocity of the shaft 5.

The measuring device 3 can furthermore be designed to ascertain the efficiency n of the machine driving the shaft according to $$\eta=P/P_{in}, \qquad (8)$$

wherein P denotes the transmitted power and $P_{in}$ denotes the applied power.

Moreover, the measuring device can be designed for the time averaging of the above-mentioned variables (in particular the detected measured variables and/or the detected total of the first and the second measured variable and/or the detected difference between the first and the second measured variable and/or the power and/or the efficiency) over a predetermined time frame, whereby chronologically smoothed measured values can be obtained.

For example, by using the time-averaged measured variables $\langle X_{E/R1}\rangle$ and $\langle X_{E/R2}\rangle$ in the above equations instead of the instantaneous values $X_{E/R1}$ and $X_{E/R2}$, the chronological mean values of the above-mentioned parameters (for example, the chronological mean values of $X_S$, $X_R$, $X_T$, P, η and the rotation parameters, location parameters, and other operation parameters computed therefrom) can be ascertained by means of the measuring device 3. The angular brackets $\langle \ldots \rangle$ denote a chronological mean value.

If the measuring device 3 is embodied as an air coil arrangement, i.e., without flux conduction structure, the measuring device can be substantially independent of thermal influences, wherein the measurement results are not subject to thermal drift.

The measuring device 3 can comprise (for example, as part of the sensor element 25, see FIG. 1B) a flux conduction structure 23 for conducting the magnetic flux. An improvement of the magnetic coupling is thus enabled. Due to the improvement of the magnetic coupling between the shaft 5 and the sensor element 25, the measurement distance a of the sensor element 25 in relation to the shaft 5 can be increased, for example, because of an increase of the electrical measured variables. An increase of the electrical measured variables means an improvement of the signal-to-noise ratio (SNR) in many applications.

The measurement results supplied by the measuring device 3 can be subject to a thermal drift, which can result in a corruption of the measurement results ascertained by the measuring device 3 (for example, in the event of varying ambient temperature). Such a thermal drift can be caused, for example, by the temperature dependence of the material properties of the flux conduction structure 23 and/or the shaft 5. The introduction of a high-permeability flux conduction structure 23 can thus influence the above-explained measuring method in such a way that a thermal drift is overlaid on the electrical measured variables $X_{E/R1}$ and $X_{E/R2}$, which can subsequently be isolated and compensated for to improve the measurement accuracy. This temperature dependence can be taken into consideration by means of a temperature-dependent correction parameter $X_\theta$ (wherein θ denotes the temperature), wherein equations (1) and (2) assume the following form:

$$X_{E/R1}=B_E-B_{R1}=X_S+X_R-X_T-X_\theta \qquad (9)$$

$$X_{E/R2}=B_E-B_{R2}=X_S-X_R-X_T-X_\theta. \qquad (10)$$

In this case, the total $\Sigma X_{12}$ of the first and the second measured variable results as $$\Sigma X_{12}=X_{E/R1}+X_{E/R2}=2(X_S-X_T-X_\theta), \qquad (11)$$

and the difference $\Delta X_{12}$ between the first and the second measured variable furthermore results as $$\Delta X_{12}=X_{E/R1}-X_{E/R2}=2X_R, \qquad (12)$$

so that the rotation-dependent contribution $X_R$ can be ascertained as usual as $$X_R=\Delta X_{12}/2, \qquad (13)$$

while in contrast the torsion-dependent contribution $X_T$ results from $$X_T=X_S-X_\theta-\Sigma X_{12}/2. \qquad (14)$$

The velocity-proportional fraction $X_R$ of the amplitude or phase change can again be ascertained directly. The torsion-proportional signal fraction $X_T$ is overlaid by a drift-proportional signal fraction $X_\theta$ in addition to the fraction $X_S$ presumed as known.

In this regard, it can be provided that the measuring device 3 comprises a temperature sensor 33 and is designed to ascertain the value of the temperature-dependent correction parameter $X_\theta$ based on the temperature detected by the temperature sensor 33. The measuring device 3 can moreover be designed to ascertain the contribution $X_T$ dependent on the torsion according to equation (14) on the basis of the total $\Sigma X_{12}$ of the first and the second measured variable in consideration of the ascertained value for $X_\theta$, wherein based on the provided contribution $X_T$, for example, the torsional moment $M_T$ applied to the shaft can be ascertained (in the unit Nm).

The values of $X_\theta$ for different temperatures θ can be ascertained, for example, by means of a calibration, i.e., by means of targeted setting of known temperatures and subsequent ascertainment of the value of $X_\theta$ provided at the respective temperature and stored as a reference characteristic in the measuring device 3. According to FIG. 1B, the temperature sensor 33 is arranged as an example in contact with the flux conduction structure 23, so that the temperature of the flux conduction structure 23 is detected by the temperature sensor 33.

Instead of the instantaneous values $X_{E/R1}$ and $X_{E/R2}$, the chronologically averaged measured variables $\langle X_{E/R1} \rangle$ and $\langle X_{E/R2} \rangle$ can also be used in above equations (13) and (14) to ascertain chronologically averaged measurement results.

Alternatively to the correction of the thermally-related drift by means of measurement of the temperature, it can be provided that the measuring device 3 (for example, by designing and activating the power source 27 accordingly) is designed to apply at least two different excitation frequencies to the exciter coil 9 and analyze the measured variables provided for the different excitation frequencies. It can be provided, for example, that the measuring device 3 is designed to detect the total $\Sigma X_{12}$ for each of the excitation frequencies and to ascertain the torsion-dependent contribution $X_T$ based on the ascertained totals.

As an example, the measuring device 3 can be designed for the (simultaneous or sequential) application of a first exciter signal having a first frequency $\Omega_1$ and of a second exciter signal having a second frequency $\Omega_2$ to the exciter coil 9. The total of the first measured variable and the second measured variable is then provided for the two excitation frequencies $\Omega_1$, $\Omega_2$:

$$\langle X_S - X_T - X_\theta \rangle_{\Omega_1} = \tfrac{1}{2}\Sigma \langle X_{E/R1}+X_{E/R2} \rangle_{\Omega_1} = \tfrac{1}{2} \Sigma \langle X_{12} \rangle_{\Omega_1} \quad (15)$$

$$\langle X_S - X_T - X_\theta \rangle_{\Omega_2} = \tfrac{1}{2}\Sigma \langle X_{E/R1}+X_{E/R2} \rangle_{\Omega_2} = \tfrac{1}{2} \Sigma \langle X_{12} \rangle_{\Omega_2}. \quad (16)$$

With a system-invariant transfer function $G(\Omega_1,\Omega_2)$, which may be ascertained by computer or experimentally for the measuring arrangement, this linear equation system may be solved for $X_\theta$ with the assumption of $\langle X_{Stat} \rangle = 0$ or $\langle X_{Stat} \rangle \neq 0$ and thus a possible thermal drift may be compensated for. By means of this frequency-based compensation method, in addition to measured variable changes which originate from temperature changes of the flux conduction structure 23, measured variable changes which originate from temperature changes of the shaft 5 may also be compensated for.

Alternatively to the correction of the thermal drift, it can also be provided that such a drift is prevented and/or limited beforehand, for example by means of regulation of the temperature (thermostatic control) of the measuring device 3 and/or of the sensor element 25 or of parts thereof. In this regard, it can be provided that the measuring device 3 comprises a temperature control device (not shown) for the temperature control of the flux conduction structure to a predetermined constant temperature.

In the device analogous to FIGS. 1A and 1B, an analysis by means of vector voltmeter can also be provided (not shown), as briefly described hereafter. In this case, the activation signal is generated via microcontroller. The signal generation is performed by a "signal genesis" via "lookup table", in which the chronological (phase, frequency) and amplitude-faithful value specification of the signal is variably predetermined. The value specification which discretely specifies the chronological and amplitude-faithful signal form is converted via a "direct digital synthesis" into a discrete electric signal. A "digital-to-analog converter" associates the weighted amplitudes at the corresponding time step with a voltage value and thus forms an analog signal available at the output of the D-A converter. This analog signal is amplified as desired by an amplifier in the circuit of a constant current source. The transmitter inductance LE supplied by the amplifier generates a magnetic field, which is modulated in dependence on torsion and angular velocity, etc. The magnetic induction of the transmitter coil modulated by the measurement object is converted by the receiver coils LR into an analog electric signal (D-A conversion). The analog-digital conversion is performed by the corresponding converter. The downstream phase comparators analyze the "random" position of the phase indicator. The phase indicator of the reference channel is shifted by 90°, that of the measurement channel is readjusted variably to a phase of 90° in relation to the reference to obtain an orthogonal system of the measurement voltages. If this orthogonal system becomes misaligned by the measurement effect due to an effect-related phase shift, this can be computed from the integrated voltages Ux and/or Uy.

Figure 2:
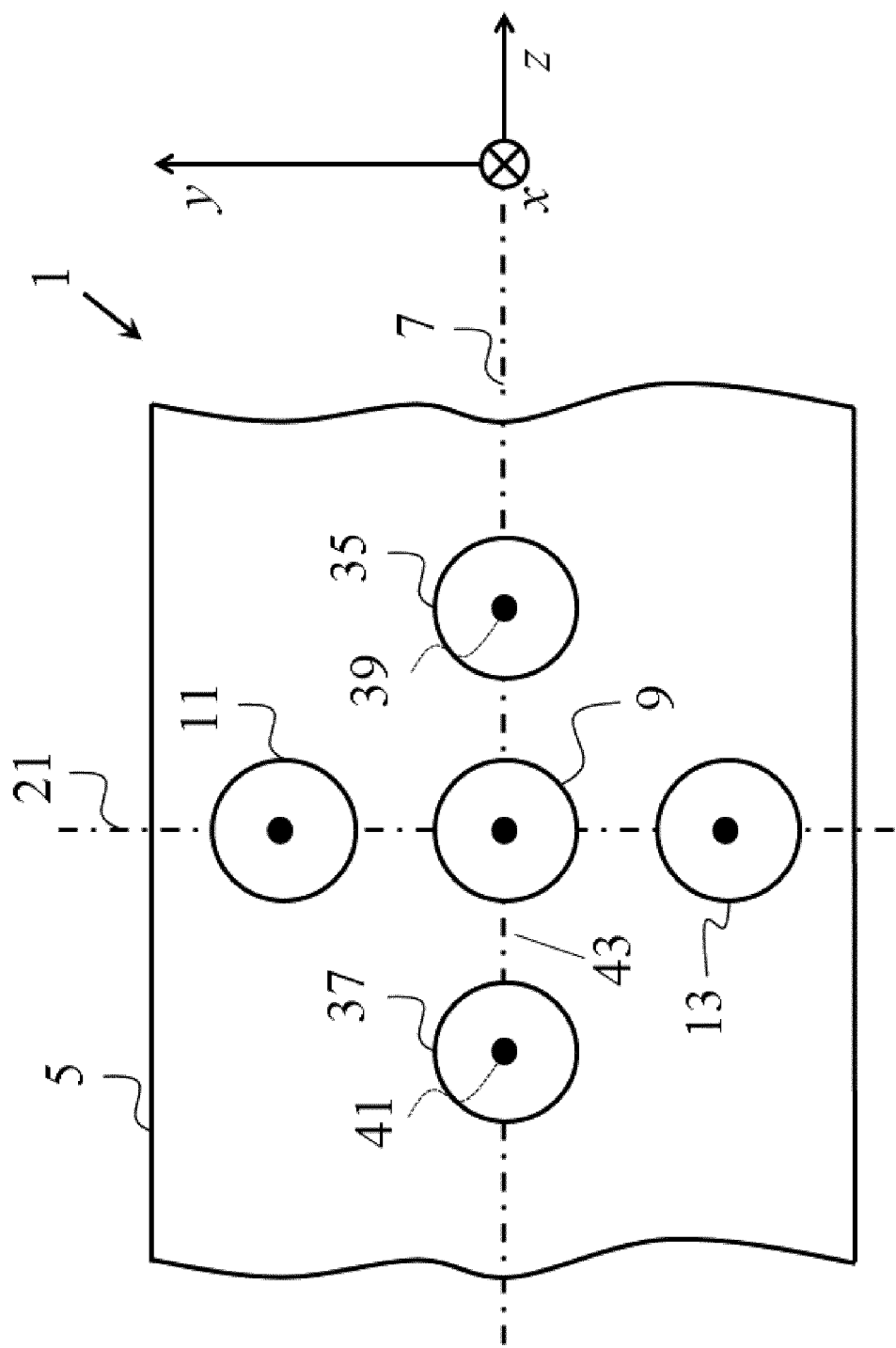
FIG. 2 shows a measuring arrangement according to a further embodiment having a measuring device having four magnetic field detectors.

FIG. 2 shows a measuring arrangement 1 having a measuring device 3 according to another embodiment. In addition to the elements explained with reference to FIGS. 1A and 1B, the measuring device 3 according to FIG. 2 comprises a third magnetic field detector 35 and a fourth magnetic field detector 37. In FIG. 2, the power source 27, the analysis device 29, and the optional flux conduction structure 23 are not shown for better comprehensibility. As an example, in the embodiment according to FIG. 2, the shaft 5 is a hollow shaft or solid shaft which consists of a ferromagnetic and electrically conductive material.

The third 35 and the fourth 37 magnetic field detector are each embodied as a coil as an example, which are also denoted as a third receiver coil 35 and a fourth receiver coil 37. The third and the fourth magnetic field detector can also be designed in the form of another magnetic-field-sensitive detector, however, for example as a Hall detector. The exciter coil 9 is arranged between the third receiver coil 35 and the fourth receiver coil 37.

According to FIG. 2, the third receiver coil 35 and the fourth receiver coil 37 are arranged in such a way that they are intersected by the exciter radial plane (xz plane) and/or are located in the exciter radial plane. The third 35 and fourth 37 receiver coil are arranged in such a way that the receiver coil axes 39 and 41 thereof, respectively, extend in parallel to the exciter coil axis 15 (and thus in parallel to the x axis and/or the exciter plane radial direction). The coil axes 17, 19, 39, 41 of all four receiver coils 11, 13, 35, 37 thus also extend in parallel to one another. The sensor secondary axis 43, which is provided by the connecting line between the third 35 and the fourth 37 receiver coil, extends in parallel to the z axis according to FIG. 2. The sensor secondary axis 43 thus extends perpendicularly to the sensor main axis 21. Moreover, both the exciter coil axis 15 and also the receiver coil axes 17, 19, 39, 41 extend perpendicularly to the sensor secondary axis 43. According to FIG. 2, the sensor main axis 21 thus extends perpendicularly to the exciter radial plane (xz plane), while in contrast the sensor secondary axis 23 is located within the exciter radial plane.

The third 35 and the fourth 37 receiver coil are formed identically to one another and identically to the other coils 9, 11, 13. The third 35 and the fourth 37 receiver coil are arranged equidistantly and symmetrically on both sides of the exciter coil 9 along the sensor secondary axis 43. The exciter coil 9 is thus arranged in the middle between the third 35 and the fourth 37 receiver coil. Moreover, all four receiver coils 11, 13, 35, 37 are arranged equidistantly from the exciter coil 9. In the embodiment according to FIG. 2, the four receiver coils are thus arranged in a cross shape and at equidistant intervals around the exciter coil.

Figure 4:
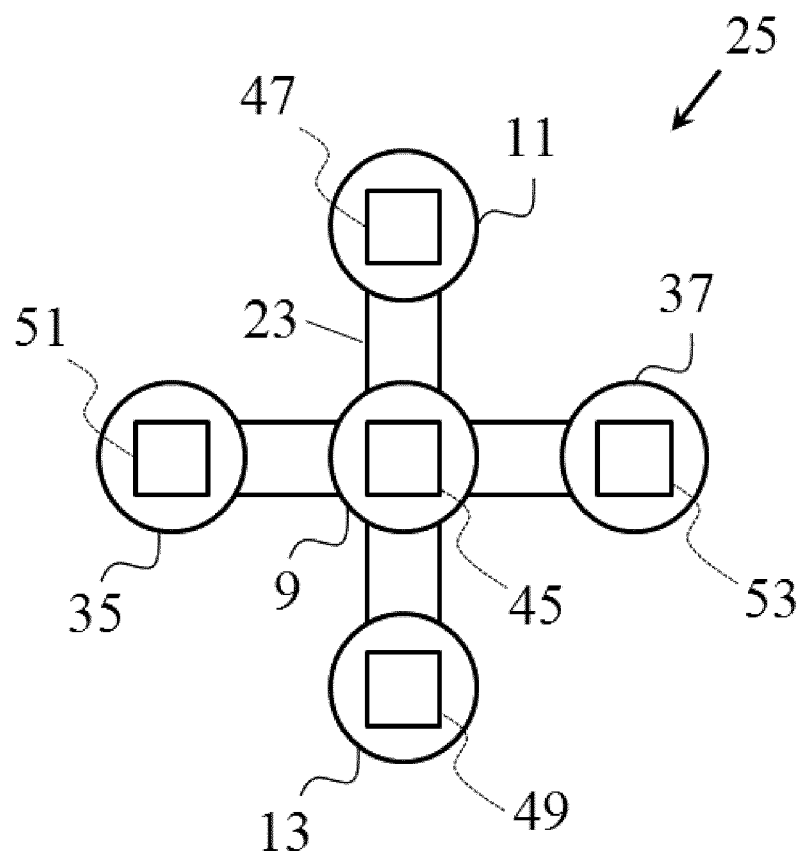
FIG. 4 shows a top view of a cross-shaped flux conduction structure having coils.

The measuring device 3 according to FIG. 2 can optionally comprise a cross-shaped flux conduction structure having five poles according to FIG. 4 (not shown in FIG. 2), wherein the exciter coil 9 is arranged on the central pole 45 and each of the receiver coils 11, 13, 35, 37 is arranged on one of the peripheral poles 47, 49, 51, 53 of the cross-shaped flux conduction structure 23.

The distance between the exciter coil 9 and the third receiver coil 35 is less than the diameter of the shaft 5. The distance between the exciter coil 9 and the fourth receiver coil 37 is also less than the diameter of the shaft 5. The internal cross section and the external cross section of each of the coils 9, 11, 13, 35, 37 is less than the cross section of the shaft 5. Moreover, the distance between the third receiver coil 35 and the fourth receiver coil 37 is less than the diameter of the shaft 5.

The modified overall magnetic field also induces a voltage in the third 35 and the fourth 37 receiver coil which is accompanied by an electric current. The analysis device 29 is also connected to the third 35 and the fourth 37 receiver coil (not shown). The measuring device 3 is designed to detect the electric current resulting at the third receiver coil 35 as a third output signal and to detect the current resulting at the fourth receiver coil 37 as a fourth output signal by means of the analysis device 29. Alternatively thereto, the measuring device 3 can also be designed to detect the electric voltage resulting at the third receiver coil 35 as a third output signal and to detect the voltage resulting at the fourth receiver coil 37 as a fourth output signal.

The measuring device 3 according to FIG. 2 is designed analogously to the embodiment according to FIGS. 1A, 1B to ascertain the first measured variable $X_{E/R1}$ as a first measurement channel, to ascertain the second measured variable $X_{E/R2}$ as a second measurement channel, to ascertain the total $\Sigma X_{12}$ of the first and the second measured variable, and to ascertain the difference $\Delta X_{12}$ between the first and the second measured variable.

In the embodiment according to FIG. 2, the measuring device 3 (in addition to the functionality described with reference to FIG. 1) is moreover designed to detect the difference with respect to amplitude and/or phase between the exciter signal and the third output signal as the third measured variable and between the exciter signal and the fourth output signal as the fourth measured variable by means of the analysis device 29.

In the embodiment according to FIG. 2, the measuring device 3 (in addition to the functionality described with reference to FIG. 1) is moreover designed to ascertain the total of the third and the fourth measured variable by means of the analysis device 29. The measuring device 3 is moreover designed to ascertain the difference between the third and the fourth measured variable by means of the analysis device 29. Moreover, the measuring device 3 is designed to characterize the torsion state, the rotation state, and the positioning of the shaft based on the ascertained total and the ascertained difference, as explained hereafter.

The third measured variable $X_{E/R3}$ and the fourth measured variable $X_{E/R4}$ can be written as follows:

$$X_{E/R3}=B_E-B_{R3} \tag{17}$$

$$X_{E/R4}=B_E-B_{R4}, \tag{18}$$

wherein the index E denotes the magnetic field generator 9 (here: the exciter coil 9), the index R3 denotes the third magnetic field detector 35 (here: the third receiver coil 35), the index R4 denotes the fourth magnetic field detector 37 (here: the fourth receiver coil 37), $B_E$ denotes the reference variable of the exciter signal, $B_{R3}$ denotes the reference variable of the third output signal, and $B_{R4}$ denotes the reference variable of the fourth output signal, wherein the reference variable is either the amplitude or the phase of the respective signal.

For the measuring arrangement according to FIG. 2, the total $\Sigma X_{34}$ of the third measured variable $X_{E/R3}$ and the fourth measured variable $X_{E/R4}$ results as $$\Sigma X_{34}=X_{E/R3}+X_{E/R4}=2(X_S-X_T), \tag{19}$$

wherein the embodiment according to FIG. 2 is designed as an example to detect the total $\Sigma X_{34}$ as a third measurement channel. Therefore, two equations for the two unknowns $X_S$ and $X_T$ are provided by equations (3) and (19), so that both $X_T$ and also $X_S$ can be ascertained. Accordingly, a calibration of $X_S$ can be omitted.

Therefore, in the embodiment according to FIG. 2, the measuring device can be designed, for example, to ascertain $X_S$ based on the total $\Sigma X_{12}$ of the first and the second measured variable and on the total $\Sigma X_{34}$ of the third and the fourth measured variable. Moreover, the measuring device 3 can be designed to ascertain the distance a between the sensor element 25 and the shaft 5 based on the ascertained value for $X_S$.

If the measuring device 3 according to FIG. 2 is embodied as an air coil arrangement, i.e., without flux conduction structure, the measuring device can be substantially independent of thermal influences and/or drift-free, wherein the measurement results are not subject to thermal drift. However, the measurement results supplied by the measuring device 3 according to FIG. 2 can also be subject to a thermal drift, wherein such a thermal drift can be caused, for example, by the temperature dependence of the material properties of the cross-shaped flux conduction structure 23 and/or the shaft 5. This thermal drift can be corrected or prevented, for example, similarly to the procedures described with reference to the embodiment according to FIGS. 1A and 1B. If the measuring device 3 is embodied having a temperature sensor and compensation of the thermal drift by means of a correction factor, which is ascertained in dependence on the temperature ascertained by means of the temperature sensor, the number of the required measurement channels can be left at three. The number of the required measurement channels can also be left at three if a thermal drift is prevented by means of thermostatic control by a temperature control unit. If the thermal drift is compensated for by means of use of exciter signals having different frequencies, a fourth measurement channel can be required.

Otherwise, the construction and the functionality of the measuring arrangement according to FIG. 2 correspond to those of the measuring arrangement according to FIGS. 1A, 1B, so that reference is made in this regard to the explanations with reference to FIGS. 1A and 1B.

Figure 3:
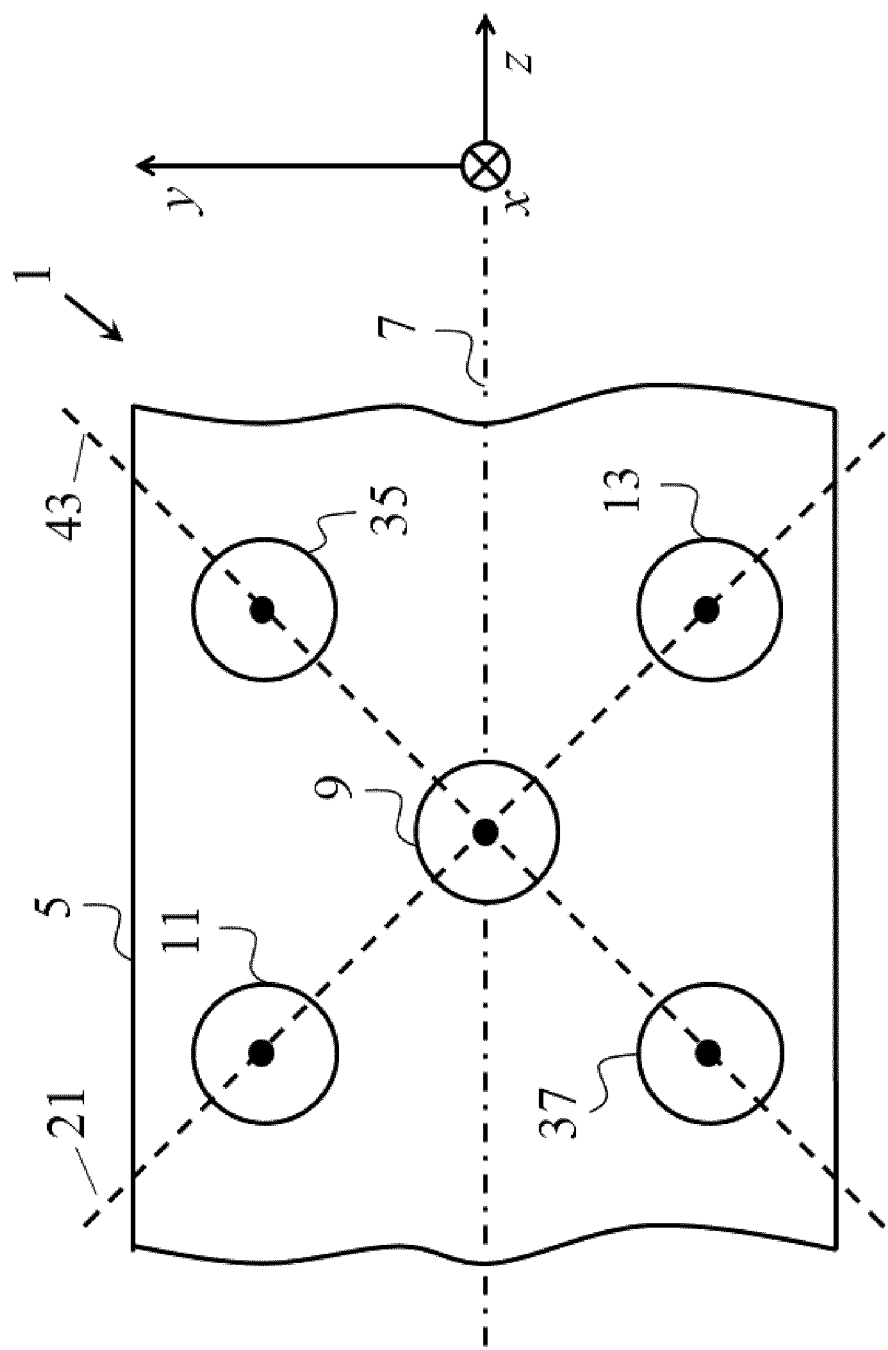
FIG. 3 shows a measuring arrangement according to a further embodiment having a measuring device having four magnetic field detectors.

FIG. 3 shows a measuring arrangement 1 according to another embodiment, wherein the coil arrangement having the exciter coil 9 and the four receiver coils 11, 13, 35, 37 is rotated mathematically positively by 45° in relation to the embodiment according to FIG. 2, specifically around the exciter coil axis 15 as the axis of rotation. The power source 27, the analysis device 29, and the optional flux conduction structure 23 are also not shown in FIG. 3 for better comprehensibility.

According to FIG. 3, the first receiver coil 11 and the third receiver coil 35 are arranged on one side of the exciter radial plane provided by the xz plane (namely on the side of the xz plane having positive y values), wherein the second receiver coil 13 and the fourth receiver coil 37 are arranged on the other side of the exciter radial plane (namely on the side of the xz plane having negative y values). In the embodiment according to FIG. 3, the sensor main axis 21 thus forms an angle of 45° with the exciter radial plane, wherein moreover the sensor secondary axis 43 also forms an angle of 45° with the exciter radial plane, wherein the sensor secondary axis 43 extends perpendicularly to the sensor main axis 21 analogously to FIG. 2.

The embodiment of the measuring arrangement and the measuring method according to FIG. 3 are suitable in particular for shafts 5, which comprise a coating having ferromagnetic and electrically conductive material on the outer circumference thereof (wherein the remainder of the shaft can consist of non-ferromagnetic material). As an example, in the embodiment according to FIG. 3, the shaft 5 is a hollow shaft or solid shaft made of a non-ferromagnetic material, which is coated on its external circumference using a layer made of a ferromagnetic and electrically conductive material.

For the geometry of the measuring arrangement 1 according to FIG. 3, the first, second, third, and fourth measured variable can then be written as follows:

$$X_{E/R1}=X_S+X_R+X_T \tag{20}$$

$$X_{E/R2}=X_S-X_R+X_T \tag{21}$$

$$X_{E/R3}=X_S+X_R-X_T \tag{22}$$

$$X_{E/R4}=X_S-X_R-X_T, \tag{23}$$

since a (homogeneous) ferromagnetic coating of the shaft is loaded with tension along a first direction (also denoted as tension direction) and is loaded with compression along a second direction (also denoted as compression direction) when a torsional moment is applied to the shaft 5 and a torsion of the shaft is thus provided. This is accompanied by an increase of the magnetic susceptibility in the tension direction and a reduction of the magnetic susceptibility in the compression direction.

For the case that the tension direction of the shaft load in the case of torsion extends along the sensor main axis 21 and the compression direction extends along the sensor secondary axis 43, $X_T$ is positive, wherein the first measured variable $X_{E/R1}$ and the second measured variable $X_{E/R2}$ increase by the (torsion-dependent) absolute value $X_T$ and wherein the third measured variable $X_{E/R3}$ and the fourth measured variable $X_{E/R4}$ decrease by the same absolute value $X_T$.

The contributions $X_S$, $X_R$, and $X_T$ can be separated from one another and ascertained by corresponding calculation of the total and the difference from equations (20) to (23). Since three variables are to be ascertained with $X_S$, $X_R$, and $X_T$, a three-channel measurement is required. If the static contribution $X_S$ is known (for example, from a separate measurement without rotation and torsion of the shaft 5), a two-channel measurement is sufficient.

If the measuring device 3 according to FIG. 3 is embodied as an air coil arrangement, i.e., without flux conduction structure, the measuring device can be substantially independent of thermal influences and/or drift-free, wherein the measurement results are not subject to a thermal drift. However, the measurement results supplied by the measuring device 3 according to FIG. 3 can also be subject to a thermal drift, wherein such a thermal drift can be caused, for example, by the temperature dependence of the material properties of the cross-shaped flux conduction structure 23 and/or the shaft 5.

This temperature dependence can be taken into consideration by means of a temperature-dependent correction parameter $X_\theta$ (wherein $\theta$ denotes the temperature), whereby equations (20) to (21) assume the following form in consideration of the temperature-dependent correction parameter $X_\theta$:

$$X_{E/R1}=X_S+X_R+X_T-X_\theta \tag{24}$$

$$X_{E/R2}=X_S-X_R+X_T-X_\theta \tag{24}$$

$$X_{E/R3}=X_S+X_R-X_T-X_\theta \tag{26}$$

$$X_{E/R4}=X_S-X_R-X_T-X_\theta. \tag{27}$$

The parameter space is thus increased (for example, upon use of a magnetic flux conduction structure because of the temperature dependence of its material properties) by the variable $X_\theta$, which has to be separated from the variables $X_S$, $X_R$, and $X_T$.

This thermal drift can be corrected or prevented, for example, similarly to the procedures described with reference to the embodiment according to FIGS. 1A, 1B, and 2. Since four variables are to be ascertained with $X_S$, $X_R$, $X_T$, and $X_\theta$, a four-channel measurement is required. If the static contribution $X_S$ is known (for example, from a separate measurement without rotation and torsion of the shaft 5), a three-channel measurement is sufficient. If the measuring device 3 according to FIG. 3 is embodied having a temperature sensor and compensation of the thermal drift by means of a correction factor, which is ascertained in dependence on the temperature ascertained by means of the temperature sensor, the number of the required measurement channels can also be reduced by one channel. The number of the required measurement channels can also be reduced by one channel in the case of prevention of a thermal drift by means of thermostatic control by a temperature control unit. In the case of compensation of the thermal drift by means of use of exciter signals having different frequencies, four measurement channels can be required.

For the case, in the arrangement according to FIG. 3, that the shaft 5 is a hollow shaft or solid shaft made of a non-ferromagnetic material, which is coated on its outer circumference using a layer made of a ferromagnetic and electrically conductive material (also referred to as a laminated shaft), in principle only three coils (including the transmitter coil) are required for the detection of velocity, torsion, and location in comparison to the linear coil arrangement. A measurement of the mentioned parameters can thus be performed via half of the arrangement. The fundamental relationships result as follows:

$$X_{E/R1}=X_S+X_R+X_T \tag{28}$$

$$X_{E/R2}=X_S-X_R+X_T \tag{29}$$

$$X_{E/R3}=X_S+X_R-X_T \tag{30}$$

$$X_{E/R4}=X_S-X_R-X_T. \tag{31}$$

It follows from the totals of the equations associated in pairs from equations (28) to (31):

$$\Sigma X_{14}=\Sigma X_{32}=2X_S \tag{32}$$

and it follows from the differences:

$$\Delta X_{14}=2(X_R+X_T) \quad (33)$$

$$\Delta X_{32}=2(X_R-X_T). \quad (34)$$

Since the reduction of the signal in the compression direction corresponds to the increase in the tension direction, the two differences $\Delta X_{14}$ and $\Delta X_{32}$ are comparable or equivalent.

The arrangement according to FIG. 3 can also be used for non-laminated measurement objects (shaft without functional layer), for example for solid or hollow shafts consisting completely of ferromagnetic and electrically conductive material. In this case, in principle only three coils (including the exciter coil) are required for the detection of velocity, torsion, and location in comparison to the linear coil arrangement. A measurement of the mentioned parameters can thus be performed via half of the arrangement. The fundamental relationships result as follows:

$$X_{E/R1}=X_S+X_R-X_T \quad (35)$$

$$X_{E/R4}=X_S-X_R-X_T \quad (36)$$

or alternately $$X_{E/R3}=X_S+X_R-X_T \quad (37)$$

$$X_{E/R2}=X_S-X_R-X_T. \quad (38)$$

In turn it follows from the total of the equations associated in pairs from equations (35) to (38):

$$\Sigma X_{14}=\Sigma X_{32}=2(X_S-X_T) \quad (39)$$

and from the difference:

$$\Delta X_{14}=\Delta X_{32}=2X_R. \quad (39)$$

LIST OF THE REFERENCE SIGNS USED 1 measuring arrangement
3 measuring device
5 shaft
7 shaft longitudinal axis
9 magnetic field generator/exciter coil
11 first magnetic field detector/first receiver coil
13 second magnetic field detector/second receiver coil
15 coil axis of the exciter coil/exciter coil axis
17 coil axis of the first receiver coil
19 coil axis of the second receiver coil
21 sensor main axis
23 flux conduction structure
25 sensor element
27 electrical power source
29 analysis device
31 rotational direction of the shaft
33 temperature sensor
35 third magnetic field detector/third receiver coil
37 fourth magnetic field detector/fourth receiver coil
39 coil axis of the third receiver coil
41 coil axis of the fourth receiver coil
43 sensor secondary axis
45-53 poles of the cross-shaped flux conduction structure
a distance between sensor element and shaft
$X_{E/R1}$ first measured variable
$X_{E/R2}$ second measured variable
$X_{E/R3}$ third measured variable
$X_{E/R4}$ fourth measured variable
$\Sigma X_{nm}$ total of the nth and the mth measured variable
$\Delta X_{nm}$ difference between the nth and the mth measured variable

The invention claimed is:

1. A measuring device for characterizing at least one of a torsion, a rotation or a positioning of a shaft, the measuring device comprising:
  a first magnetic field detector and a second magnetic field detector for detecting a magnetic field;
  a magnetic field generator for generating a magnetic field, said magnetic field generator being disposed between said first magnetic field detector and said second magnetic field detector;
  the measuring device being configured to apply a chronologically periodically varying electrical exciter signal to said magnetic field generator causing said magnetic field generator to generate a chronologically periodically varying magnetic field, the magnetic field being modified by the shaft to be characterized, a first electrical output signal being induced at said first magnetic field detector and a second electrical output signal being induced at said second magnetic field detector by the modified magnetic field;
  the measuring device being configured to detect a difference with respect to amplitude or phase between the exciter signal and the first output signal as a first measured variable and between the exciter signal and the second output signal as a second measured variable; and
  the measuring device being configured to determine at least one of a sum of the first and the second measured variables or a difference between the first and the second measured variables.

2. The measuring device according to claim 1, wherein said magnetic field generator is a coil functioning as an exciter coil.

3. The measuring device according to claim 2, wherein said first magnetic field detector is a first coil functioning as a first receiver coil and said second magnetic field detector is a second coil functioning as a second receiver coil.

4. The measuring device according to claim 3, wherein said exciter coil, said first receiver coil and said second receiver coil have coil axes extending parallel to one another at a distance from one another.

5. The measuring device according to claim 1, wherein the measuring device is configured to apply at least two chronologically periodic electrical exciter signals having different frequencies to said magnetic field generator.

6. The measuring device according to claim 5, wherein the measuring device is configured to detect the first and second measured variables for each of the frequencies, to ascertain the total of the first and second measured variables for each of the frequencies, and to ascertain a torsional moment applied to the shaft based on the totals.

7. The measuring device according to claim 1, which further comprises a third magnetic field detector and a fourth magnetic field detector, said magnetic field generator being disposed between said third magnetic field detector and said fourth magnetic field detector.

8. The measuring device according to claim 7, wherein said first and second magnetic field detectors are disposed at positions along a sensor main axis, said third and fourth magnetic field detectors are disposed at positions along a sensor secondary axis, and the sensor main axis is perpendicular to the sensor secondary axis.

9. The measuring device according to claim 7, wherein:
a third electrical output signal is induced at said third magnetic field detector and a fourth electrical output signal is induced at said fourth magnetic field detector by the modified magnetic field;
the measuring device is configured to detect a difference with respect to amplitude or phase between the exciter signal and the third output signal as a third measured variable and between the exciter signal and the fourth output signal as a fourth measured variable; and
the measuring device is configured to ascertain at least one of a total of the third and the fourth measured variables or a difference between the third and the fourth measured variables.

10. An arrangement for characterizing at least one of a torsion, a rotation or a positioning of a shaft having a shaft longitudinal axis, the arrangement comprising:
a measuring device according to claim 1;
said first and second magnetic field detectors being disposed with respect to a plane extending through the shaft longitudinal axis and through said magnetic field generator such that said first magnetic field detector is located on one side of the plane and said second magnetic field detector is located on the other side of the plane.

11. The arrangement according to claim 10, which further comprises:
a third magnetic field detector and a fourth magnetic field detector, said magnetic field generator being disposed between said third magnetic field detector and said fourth magnetic field detector; and
said third and fourth magnetic field detectors being disposed with respect to the plane extending through said magnetic field generator such that the plane extends through said third and fourth magnetic field detectors.

12. The arrangement according to claim 10, which further comprises:
a third magnetic field detector and a fourth magnetic field detector, said magnetic field generator being disposed between said third magnetic field detector and said fourth magnetic field detector;
said first and third magnetic field detectors being disposed on one side of the plane extending through said magnetic field generator; and
said second and fourth magnetic field detectors being disposed on the other side of the plane extending through said magnetic field generator.

13. The arrangement according to claim 10, wherein a distance between said magnetic field generator and at least one of said first magnetic field detector or said second magnetic field detector is less than a diameter of the shaft to be characterized.

14. A method for characterizing at least one of a torsion, a rotation or a positioning of a shaft, the method comprising the following steps:
generating a chronologically periodically varying magnetic field permeating the shaft by applying a chronologically periodically varying electrical exciter signal to a magnetic field generator, and the shaft to be characterized modifying the magnetic field;
detecting a difference with respect to amplitude or phase between the exciter signal and a first electrical output signal representing a strength of the modified magnetic field at a first position as a first measured variable and between the exciter signal and a second electrical output signal representing a strength of the modified magnetic field at a second position as a second measured variable, the first and second positions not being disposed in a common radial plane (xz plane) of the shaft; and
determining at least one of a sum of the first and second measured variables or a difference between the first and the second measured variables.

15. The method according to claim 14, which further comprises the following steps:
detecting a difference with respect to amplitude or phase between the exciter signal and a third electrical output signal representing a strength of the modified magnetic field at a third position as a third measured variable and between the exciter signal and a fourth electrical output signal representing the strength of the modified magnetic field at a fourth position as a fourth measured variable; and
ascertaining at least one of a total of the third and the fourth measured variables or a difference between the third and the fourth measured variables.

* * * * *